US012767159B2

(12) United States Patent
Okada et al.

(10) Patent No.: US 12,767,159 B2
(45) Date of Patent: Oct. 20, 2026

(54) PRESENTATION CONTROL DEVICE, AUTONOMOUS DRIVING CONTROL DEVICE, AND STORAGE MEDIUMS

(71) Applicant: DENSO CORPORATION, Kariya-city (JP)

(72) Inventors: Kahori Okada, Kariya-city (JP); Kazuki Izumi, Kariya-city (JP); Shiori Maneyama, Kariya-city (JP); Akihiro Hayashi, Kariya-city (JP); Takuya Kume, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 223 days.

(21) Appl. No.: 18/487,936

(22) Filed: Oct. 16, 2023

(65) Prior Publication Data

US 2024/0043031 A1 Feb. 8, 2024

Related U.S. Application Data

(63) Continuation of application No. PCT/JP2022/014948, filed on Mar. 28, 2022.

(30) Foreign Application Priority Data

Apr. 21, 2021 (JP) ................................ 2021-072095

(51) Int. Cl.

| | |
|---|---|
| ***B60W 40/04*** | (2006.01) |
| ***B60W 50/14*** | (2020.01) |
| ***B60W 60/00*** | (2020.01) |

(52) U.S. Cl.

CPC ............ *B60W 50/14* (2013.01); *B60W 40/04* (2013.01); *B60W 60/0053* (2020.02); (Continued)

(58) Field of Classification Search

CPC ............ B60W 50/14; B60W 60/0059; B60W 60/0057; B60W 60/0053; B60W 40/04; (Continued)

(56) References Cited

U.S. PATENT DOCUMENTS

| | | | | |
|---|---|---|---|---|
| 2017/0057542 | A1* | 3/2017 | Kim | B60K 35/28 |
| 2017/0090475 | A1* | 3/2017 | Choi | A61B 5/0059 |

(Continued)

FOREIGN PATENT DOCUMENTS

| | | |
|---|---|---|
| JP | 2005324661 A | 11/2005 |
| JP | 2017107502 A | 6/2017 |

(Continued)

*Primary Examiner* — Peter D Nolan
*Assistant Examiner* — Matthew Cobb
(74) *Attorney, Agent, or Firm* — Harness, Dickey & Pierce, P.L.C.

(57) ABSTRACT

An HCU, which controls information presentation to a driver of a vehicle with autonomous driving function, is configured to: determine a switch between a monitoring unnecessary state and a monitoring necessary state, the monitoring unnecessary state being a state in which stoppage of periphery monitoring by the driver during execution of the autonomous driving being permitted, the monitoring necessary state being a state in which the stoppage of the periphery monitoring by the driver during execution of the autonomous driving being prohibited; determine whether stoppage of steering wheel grip by the driver is permittable in the monitoring necessary state; and permit, when the monitoring unnecessary state is switched to the monitoring necessary state in which the stoppage of steering wheel grip is permittable, the stoppage of steering wheel grip in the monitoring necessary state after executing a grip request, which requests the driver to grip the steering wheel.

32 Claims, 21 Drawing Sheets

(52) U.S. Cl.
CPC .... *B60W 60/0057* (2020.02); *B60W 60/0059* (2020.02); *B60W 2050/143* (2013.01); *B60W 2050/146* (2013.01); *B60W 2540/223* (2020.02); *B60W 2554/406* (2020.02)

(58) Field of Classification Search
CPC ..... B60W 2540/223; B60W 2554/406; B60W 2050/143; B60W 2050/146
See application file for complete search history.

(56) References Cited

U.S. PATENT DOCUMENTS

| | | | | |
|---|---|---|---|---|
| 2018/0046185 | A1 | 2/2018 | Sato et al. | |
| 2019/0121356 | A1* | 4/2019 | Migneco | A61B 5/0077 |
| 2019/0202464 | A1* | 7/2019 | McGill | B60W 30/182 |
| 2019/0278267 | A1 | 9/2019 | Honda | |
| 2019/0286128 | A1 | 9/2019 | Kaji et al. | |
| 2020/0139992 | A1 | 5/2020 | Oba | |
| 2020/0317227 | A1 | 10/2020 | Fukamachi | |
| 2021/0080949 | A1* | 3/2021 | Takeda | B62D 1/06 |
| 2021/0370985 | A1* | 12/2021 | Lee | B60W 60/0059 |

FOREIGN PATENT DOCUMENTS

| | | | | | |
|---|---|---|---|---|---|
| JP | 2018027726 | A | | 2/2018 | |
| JP | 2019006280 | A | | 1/2019 | |
| JP | 2019067421 | A | * | 4/2019 | |
| JP | 2019155956 | A | | 9/2019 | |
| JP | 2019156356 | A | | 9/2019 | |
| JP | 2020170402 | A | | 10/2020 | |
| JP | 2022008054 | A | | 1/2022 | |
| KR | 20180110903 | A | * | 10/2018 | B60K 28/12 |
| WO | WO-2019017216 | A1 | | 1/2019 | |

* cited by examiner

PRESENTATION CONTROL DEVICE, AUTONOMOUS DRIVING CONTROL DEVICE, AND STORAGE MEDIUMS

CROSS REFERENCE TO RELATED APPLICATION

The present application is a continuation application of International Patent Application No. PCT/JP2022/014948 filed on Mar. 28, 2022, which designated the U.S. and claims the benefit of priority from Japanese Patent Application No. 2021-072095 filed on Apr. 21, 2021. The entire disclosures of all of the above applications and Japanese Patent Application No. 2020-101215 filed on Jun. 10, 2020 and Japanese Patent Application No. 2021-030064 filed on Feb. 26, 2021 are incorporated herein by reference.

TECHNICAL FIELD

The disclosure in this specification relates to a technology for controlling presentation of information to a driver of a vehicle capable of executing autonomous driving, and a technology for enabling autonomous driving.

BACKGROUND

There has been known a control system for an autonomous driving vehicle. This type of system notifies a driver of a request for switching a hands-off state to a hands-on state when switching from autonomous driving to manual driving.

SUMMARY

A presentation control device, which controls information presentation to a driver of a vehicle with autonomous driving function, is configured to: determine a switch between a monitoring unnecessary state and a monitoring necessary state, the monitoring unnecessary state being a state in which stoppage of periphery monitoring by the driver during execution of the autonomous driving being permitted, the monitoring necessary state being a state in which the stoppage of the periphery monitoring by the driver during execution of the autonomous driving being prohibited; determine whether stoppage of steering wheel grip by the driver is permittable in the monitoring necessary state; and permit, when the monitoring unnecessary state is switched to the monitoring necessary state in which the stoppage of steering wheel grip is permittable, the stoppage of steering wheel grip in the monitoring necessary state after executing a grip request, which requests the driver to grip the steering wheel.

BRIEF DESCRIPTION OF DRAWINGS

Objects, features and advantages of the present disclosure will become apparent from the following detailed description made with reference to the accompanying drawings.

DETAILED DESCRIPTION

Figure 1:
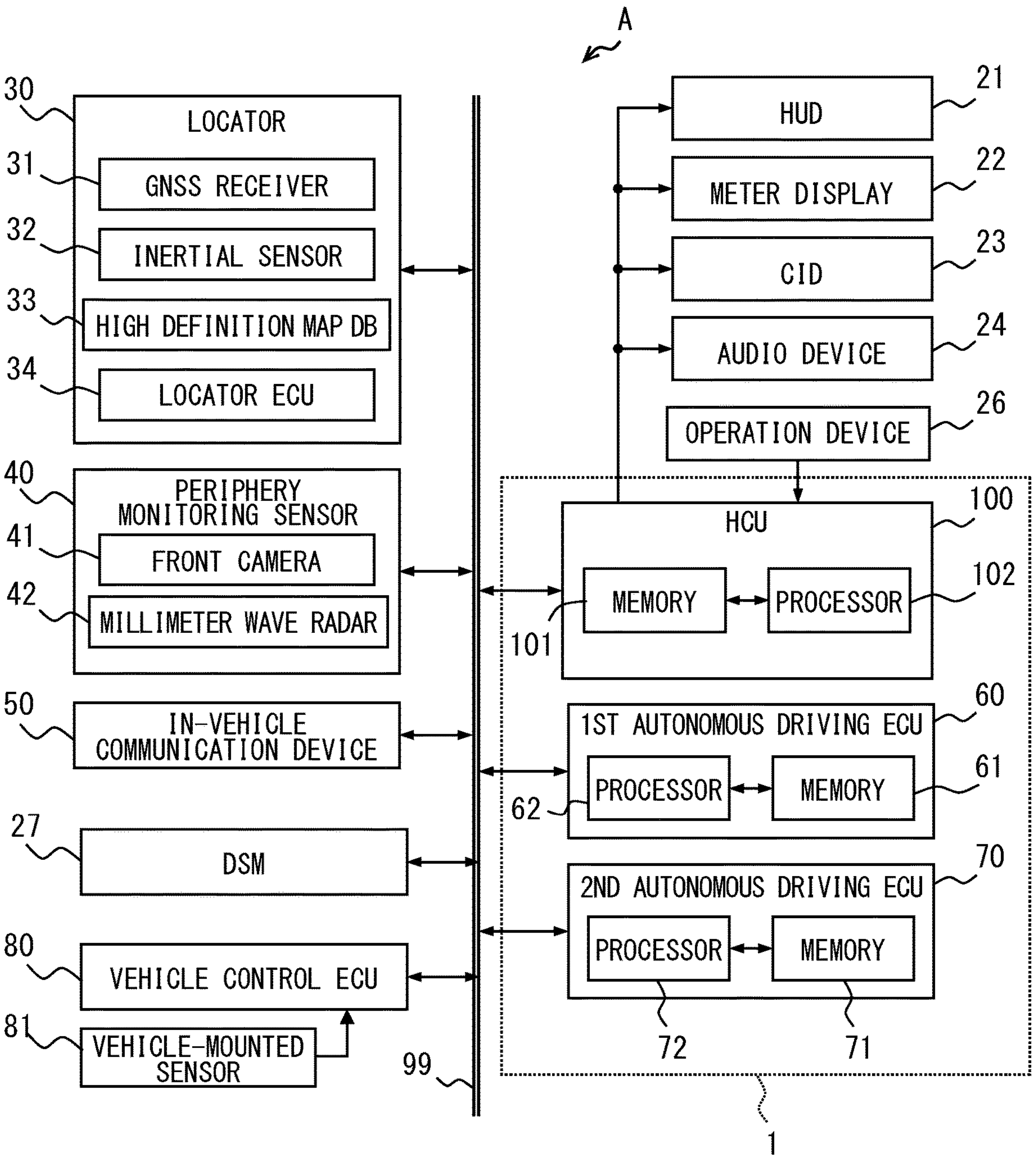
FIG. 1 is a diagram showing a system including an HCU.

In the control of autonomous driving, there is a possibility that a driver may be permitted to stop monitoring of the periphery and may be prohibited from stopping the monitoring of the periphery. During autonomous driving, a situation may occur in which the driver is permitted to release of the hands from a steering wheel while the stoppage of monitoring of the periphery is prohibited. in such a change in the state of autonomous driving, related art does not disclose how to provide information for prompting to ensure stability of travel.

According to an aspect of the present disclosure, a presentation control device controls presentation of information to a driver of a vehicle, which is capable of executing autonomous driving. The presentation control device includes a determination unit and a permit state control unit. The determination unit determines a switch between a monitoring unnecessary state and a monitoring necessary state. The monitoring unnecessary state is a state in which stoppage of periphery monitoring by the driver during execution of the autonomous driving being permitted, and the monitoring necessary state is a state in which the stoppage of the periphery monitoring by the driver during execution of the autonomous driving being prohibited. The determination unit further determines whether stoppage of steering wheel grip by the driver is permittable in the monitoring necessary state. When the monitoring unnecessary state is switched to the monitoring necessary state in which the stoppage of steering wheel grip is permittable, the permit state unit permits the stoppage of steering wheel grip in the monitoring necessary state after executing a grip request, which requests the driver to grip the steering wheel.

According to another aspect of the present disclosure, a computer-readable non-transitory storage medium stores a presentation control program, which controls presentation of information to a driver of a vehicle capable of executing autonomous driving. The program includes instructions be executed by a processor, and the instructions include: determining a switch between a monitoring unnecessary state and a monitoring necessary state, the monitoring unnecessary state being a state in which stoppage of periphery monitoring by the driver during execution of the autonomous driving being permitted, the monitoring necessary state being a state in which the stoppage of the periphery monitoring by the driver during execution of the autonomous driving being prohibited; determining whether stoppage of steering wheel grip by the driver is permittable in the monitoring necessary state; and permitting, when the monitoring unnecessary state is switched to the monitoring necessary state in which the stoppage of steering wheel grip is permittable, the stoppage of steering wheel grip in the monitoring necessary state after executing a grip request, which requests the driver to grip the steering wheel.

According to the above disclosures, when the monitoring unnecessary state is switched to the monitoring necessary state in which the stoppage of steering wheel grip is permittable, a grip request to the driver to grip the steering wheel is executed, and the stoppage of steering wheel grip in the monitoring necessary state is permitted. Therefore, the driver is prompted to grip the steering wheel when switching from the monitoring unnecessary state to the monitoring necessary state. Thus, it is possible to provide a presentation control device and a presentation control program capable of providing information prompting to ensure stability of travel.

According to another aspect of the present disclosure, an autonomous driving control device, which is capable of executing autonomous driving of a vehicle, includes a state control unit, a grip determination unit, and a request output unit. The state control unit executes a switch between a monitoring unnecessary state and a monitoring necessary state. The monitoring unnecessary state is a state in which stoppage of periphery monitoring by a driver during execution of the autonomous driving being permitted, and the monitoring necessary state is a state in which the stoppage of the periphery monitoring by the driver during execution of the autonomous driving being prohibited. The grip determination unit determines whether stoppage of steering wheel grip by the driver is permittable in the monitoring necessary state. The request output unit outputs a grip request to the driver to grip the steering wheel when a switch from the monitoring unnecessary state to the monitoring necessary state in which the stoppage of steering wheel grip is permittable is executed.

According to another aspect of the present disclosure, a computer-readable non-transitory storage medium stores an autonomous driving control program, which executes an autonomous driving of a vehicle. The program includes instructions to be executed by a processor and the instructions include: executing a switch between a monitoring unnecessary state and a monitoring necessary state, the monitoring unnecessary state being a state in which stoppage of periphery monitoring by a driver during execution of the autonomous driving being permitted, the monitoring necessary state being a state in which the stoppage of the periphery monitoring by the driver during execution of the autonomous driving being prohibited; determining whether stoppage of steering wheel grip by the driver is permittable in the monitoring necessary state; and outputting a grip request to the driver to grip the steering wheel when a switch from the monitoring unnecessary state to the monitoring necessary state in which the stoppage of steering wheel grip is permittable is executed.

According to the above disclosures, even when the monitoring unnecessary state is switched to the monitoring necessary state in which the stoppage of steering wheel grip is permittable, a grip request to the driver to grip the steering wheel is output. Therefore, the driver is prompted to grip the steering wheel when switching from the monitoring unnecessary state to the monitoring necessary state. As described above, it is possible to provide an autonomous driving device and an autonomous driving control program capable of providing information prompting to ensure the stability of travel.

According to another aspect of the present disclosure, an autonomous driving control device, which is capable of executing autonomous driving of a vehicle, includes a state control unit and a grip determination unit. The state control unit executes a switch between a monitoring unnecessary state and a monitoring necessary state. The monitoring unnecessary state is a state in which stoppage of periphery monitoring by a driver during execution of the autonomous driving being permitted, and the monitoring necessary state is a state in which the stoppage of the periphery monitoring by the driver during execution of the autonomous driving being prohibited. The grip determination unit determines whether stoppage of steering wheel grip by the driver is permittable in the monitoring necessary state. During a traffic congestion, when the state control unit executes a switch from the monitoring unnecessary state to the monitoring necessary state, the grip determination unit switches to a state in which the stoppage of steering wheel grip is permittable, and then switches to a state in which the stoppage of steering wheel grip is not permitted.

According to another aspect of the present disclosure, a computer-readable non-transitory storage medium stores an autonomous driving control program. The program executes an autonomous driving of a vehicle and includes instructions to be executed by a processor. The instructions include: executing a switch between a monitoring unnecessary state and a monitoring necessary state, the monitoring unnecessary state being a state in which stoppage of periphery monitoring by a driver during execution of the autonomous driving being permitted, the monitoring necessary state being a state in which the stoppage of the periphery monitoring by the driver during execution of the autonomous driving being prohibited; determining whether stoppage of steering wheel grip by the driver is permittable in the monitoring necessary state; when a switch from the monitoring unnecessary state to the monitoring necessary state is executed during a traffic congestion, switching to a state in which the stoppage of steering wheel grip is permittable, and then switches to a state in which the stoppage of steering wheel grip is not permitted; and outputting a grip prepare request to the driver to prepare for gripping the steering wheel when a switch from the monitoring unnecessary state to the monitoring necessary state in which the stoppage of steering wheel grip is permittable is executed during the traffic congestion.

According to the above disclosures, when the monitoring unnecessary state is switched to the monitoring necessary state during traffic congestion, a switch to the state in which the stoppage of steering wheel grip is not permitted is executed after a switch to the state in which the stoppage of steering wheel grip is permittable is executed. According to this configuration, the state in which the stoppage of steering wheel grip is permitted is temporarily provided. Therefore, when a switch from the monitoring unnecessary state to the monitoring necessary state is stopped, the state can be returned to the monitoring unnecessary state before prompting the driver to grip the steering wheel. As a result, it is possible to provide an autonomous driving device and an autonomous driving control program capable of prompting to ensure the stability of travel while ensuring convenience for the driver.

According to another aspect of the present disclosure, an autonomous driving control device, which is capable of executing autonomous driving of a vehicle, includes a state control unit and a grip determination unit. The state control unit executes a switch between a monitoring unnecessary state and a monitoring necessary state. The monitoring unnecessary state is a state in which stoppage of periphery monitoring by a driver during execution of the autonomous driving being permitted, and the monitoring necessary state is a state in which the stoppage of the periphery monitoring by the driver during execution of the autonomous driving being prohibited. The grip determination unit determines whether stoppage of steering wheel grip by the driver is permittable in the monitoring necessary state. When the grip determination unit determines the stoppage of steering wheel grip is permittable within a predetermined time after the state control unit executes a switch from the monitoring unnecessary state to manual driving, the state control unit omits a switch to the monitoring necessary state in which the stoppage of steering wheel grip is not permitted and execute a switch from the manual driving to the monitoring necessary state in which the stoppage of steering wheel grip is permittable.

According to another aspect of the present disclosure, a computer-readable non-transitory storage medium stores an autonomous driving control program. The program executes an autonomous driving of a vehicle and includes instructions to be executed by a processor. The instructions includes: executing a switch between a monitoring unnecessary state and a monitoring necessary state, the monitoring unnecessary state being a state in which stoppage of periphery monitoring by a driver during execution of the autonomous driving being permitted, the monitoring necessary state being a state in which the stoppage of the periphery monitoring by the driver during execution of the autonomous driving being prohibited; determining whether stoppage of steering wheel grip by the driver is permittable in the monitoring necessary state; in response to determining that the stoppage of steering wheel grip is permittable within a predetermined time after executing a switch from the monitoring unnecessary state to manual driving, omitting a switch to the monitoring necessary state in which the stoppage of steering wheel grip is not permitted and executing a switch from the manual driving to the monitoring necessary state in which the stoppage of steering wheel grip is permittable; and when the stoppage of steering wheel grip is determined to be permittable after elapse of the predetermined time, increasing, in stepwise manner, an autonomous driving level from the manual driving to the monitoring necessary state in which the stoppage of steering wheel grip is permittable.

According to the above disclosures, when it is determined that stoppage of steering wheel grip is permittable within a predetermined time after execution of a switch from the monitoring unnecessary state to manual driving, a switch to the monitoring necessary state in which the stoppage of steering wheel grip is not permitted is omitted. According to the above description, since a direct switch from the manual driving to the monitoring necessary state in which the stoppage of steering wheel grip is permittable is executed, the driver can end the gripping of the steering wheel early. As a result, it is possible to provide an autonomous driving device and an autonomous driving control program capable of prompting to ensure the stability of travel while improving convenience for the driver.

First Embodiment

A presentation control device according to a first embodiment will be described with reference to FIGS. 1 to 12. The presentation control device according to the first embodiment is provided by a human machine interface control unit (HCU) 100 mounted on a vehicle A. The HCU 100 forms a human machine interface (HMI) system used in the vehicle A together with multiple display devices, an audio device 24, an operation device 26, and the like. The HMI system has an input interface function for receiving operations from an occupant (for example, a driver) of the vehicle A and an output interface function for presenting information to the driver. The HCU 100 is connected to a locator 30, a periphery monitoring sensor 40, an in-vehicle communication device 50, a first autonomous driving ECU 60, a second autonomous driving ECU 70, a DSM 27, and a vehicle control ECU 80 via a communication bus 99 and the like.

The locator 30 generates subject vehicle position information and the like through composite positioning in which multiple pieces of acquired information are combined. The locator 30 includes a global navigation satellite system (GNSS) receiver 31, an inertial sensor 32, a map database (hereinafter referred to as a map DB) 33, and a locator ECU 34. The GNSS receiver 31 receives positioning signals from multiple positioning satellites. The inertial sensor 32 is a sensor that detects inertial force acting on the vehicle A. The inertial sensor 32 includes, for example, a gyro sensor and an acceleration sensor.

The map DB 33 is a non-volatile memory and stores map data such as link data, node data, road shapes, and structures. The map data may be a three-dimensional map including point groups of feature points of road shapes and structures. The three-dimensional map may be generated based on captured images by using Road Experience Management (REM). The map data may also include traffic regulation information, road construction information, weather information, signal information, and the like. The map data stored in the map DB is updated regularly or as needed based on the latest information received by the in-vehicle communication device 50 that will be described later.

The locator ECU 34 mainly includes a microcomputer having a processor, a memory, an input-output interface, and a bus connecting the constituents. The locator ECU 34 sequentially measures a position of the vehicle A (hereinafter referred to as a subject vehicle position) by combining the positioning signals received by the GNSS receiver 31, the map data in the map DB 33, and the measurement results from the inertial sensor 32. The subject vehicle position may be represented by coordinates of latitude and longitude, for example. The measurement of the subject vehicle position may be executed by using a travel distance obtained from signals sequentially output from a vehicle speed sensor mounted on the vehicle A. When a three-dimensional map including point groups of feature points of road shapes and structures is used as the map data, the locator ECU 34 may specify a subject vehicle position by using the three-dimensional map and the detection results from the periphery monitoring sensor 40 instead of using the GNSS receiver 31.

The periphery monitoring sensor 40 is an autonomous sensor that monitors the periphery environment of the vehicle A. The periphery monitoring sensor 40 can detect moving objects such as pedestrians, cyclists, animals other than humans, and other vehicles from a detection range around the vehicle A, as well as stationary objects such as falling objects on a road, guard rails, curbs, road surface markings such as traffic signs and traveling lane markings, and roadside structures. The periphery monitoring sensor 40 provides detection information obtained by detecting objects around the vehicle A to the first autonomous driving ECU 60, the second autonomous driving ECU 70, and the like through the communication bus 99.

The periphery monitoring sensor 40 has a front camera 41 and a millimeter wave radar 42 as detection constituents for object detection. The front camera 41 outputs, as detection information, at least one of imaging data obtained by imaging a range in front of the vehicle A and an analysis result of the imaging data. Multiple millimeter wave radars 42 are disposed, for example, on the front and rear bumpers of the vehicle A at intervals. The millimeter wave radar 42 applies millimeter waves or quasi-millimeter waves toward the front range, the front side range, the rear range, the rear side range, and the like of the vehicle A. The millimeter wave radar 42 generates detection information through a process of receiving reflected waves reflected by moving objects and stationary objects. The periphery monitoring sensor 40 may include other detection constituents such as light detection and ranging-laser imaging detection and ranging (LiDAR) for detecting point groups of feature points of ground objects, sonar for receiving reflected waves of ultrasonic waves, and the like.

The in-vehicle communication device 50 is a communication module mounted on the vehicle A. The in-vehicle communication device 50 has at least a vehicle to cellular network (V2N) communication function in accordance with communication standards such as Long Term Evolution (LTE) and 5G, and transmits radio waves to and from base stations around the vehicle A. The in-vehicle communication device 50 may further have functions such as vehicle to roadside infrastructure (hereinafter, V2I) communication and vehicle to vehicle (hereinafter, V2V) communication. The in-vehicle communication device 50 enables cooperation between a cloud and the in-vehicle system (cloud to car) according to V2N communication. By installing the in-vehicle communication device 50, the vehicle A becomes a connected car that can be connected to the Internet. The in-vehicle communication device 50 acquires congestion information distributed from a traffic information center or the like, and provides the congestion information to the second autonomous driving ECU 70, the HCU 100, and the like.

The first autonomous driving ECU 60 and the second autonomous driving ECU 70 mainly respectively include computers having processors 62 and 72, memories 61 and 71, input-output interfaces, buses connecting these constituents, and the like. The first autonomous driving ECU 60 and the second autonomous driving ECU 70 are ECUs capable of executing autonomous travel control for partially or substantially controlling travel of the vehicle A.

The first autonomous driving ECU 60 has a partially autonomous driving function that partially substitutes for the driver's driving operation. The second autonomous driving ECU 70 has an autonomous driving function capable of executing driving operations on behalf of the driver. As an example, the first autonomous driving ECU 60 enables partial autonomous travel control (advanced driver-assistance) at level 2 or lower in the autonomous driving levels defined by the Society of Automotive Engineers of America. That is, the first autonomous driving ECU 60 enables autonomous travel control that requires the driver to monitor the periphery. In other words, the first autonomous driving ECU 60 enables autonomous driving in which a second task, which will be described later, is prohibited.

For example, the first autonomous driving ECU 60 can execute one or both of longitudinal control and lateral control of the vehicle A. The longitudinal direction is a direction that coincides with a front-rear direction of the vehicle A, and the lateral direction is a direction that coincides with a width direction of the vehicle A. The first autonomous driving ECU 60 executes control of the acceleration and deceleration of the vehicle A as the longitudinal control. The first autonomous driving ECU 60 also executes steering angle control of steered wheels of the vehicle A as the lateral control.

Figure 2:
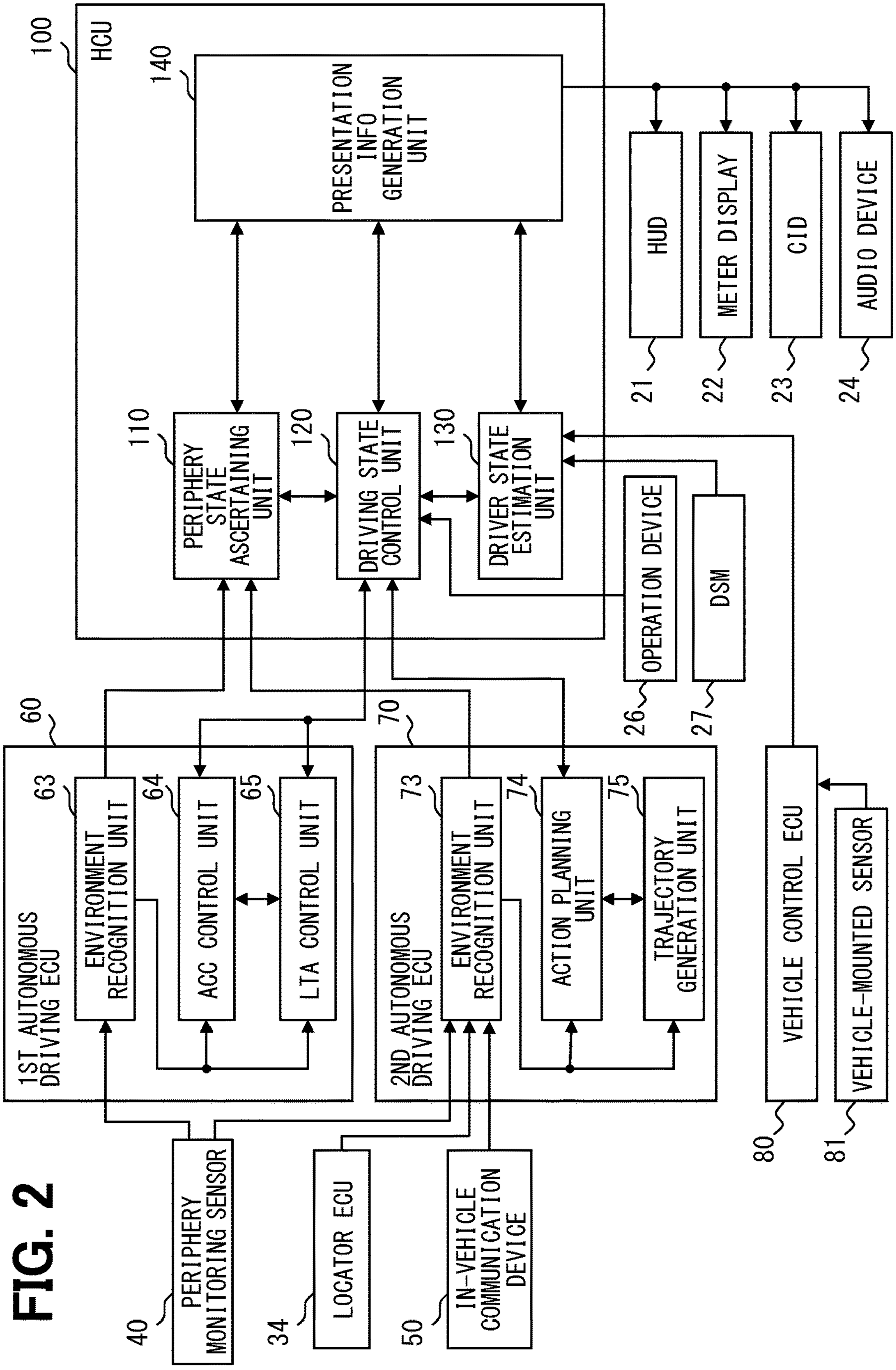
FIG. 2 is a block diagram showing an example of functions of the HCU.
Figure 3:
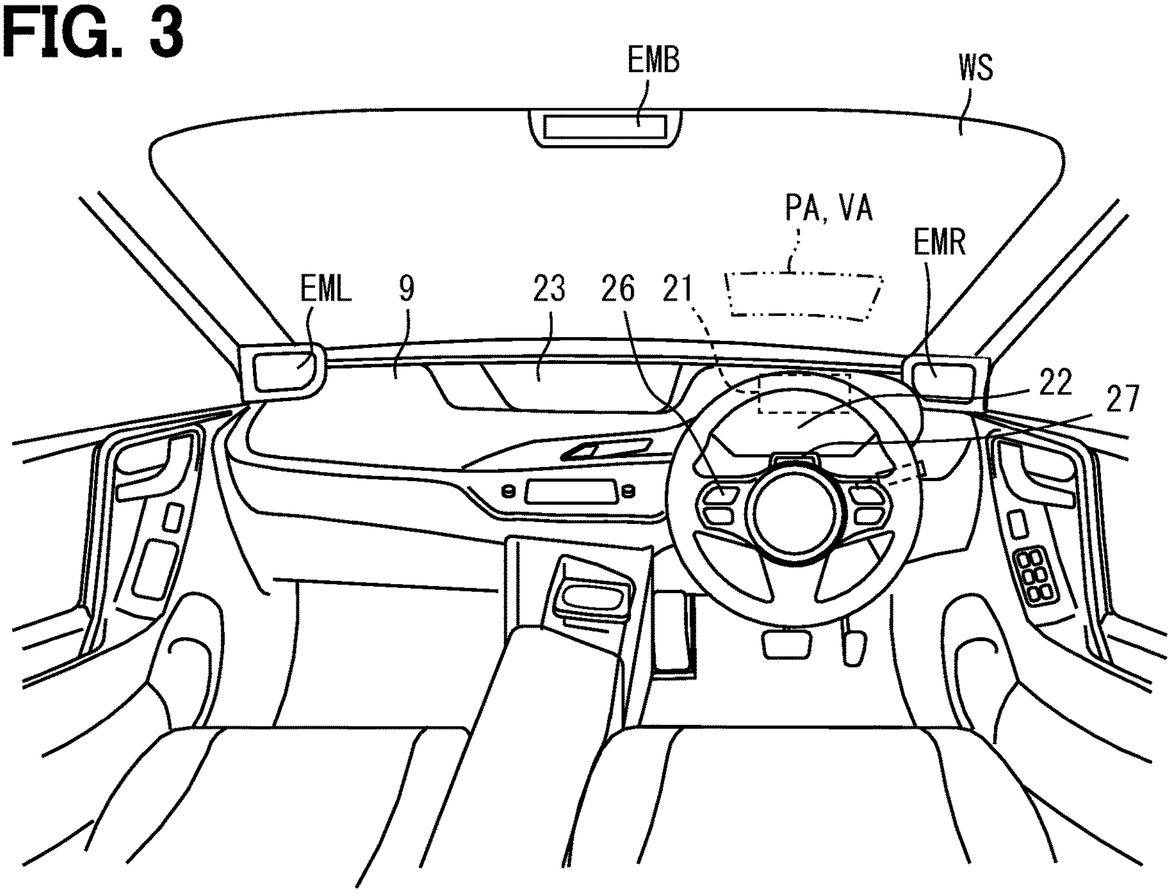
FIG. 3 is a diagram showing the inside of a vehicle compartment.

A driver-assistance program stored in the memory 61 causes the processor 62 to execute multiple instructions, and thus the first autonomous driving ECU 60 constructs multiple function units that realize the advanced driver-assistance described above. Specifically, as shown in FIG. 2, the first autonomous driving ECU 60 constructs an environment recognition unit 63, an ACC control unit 64, an LTA control unit 65, and the like as function units.

The environment recognition unit 63 recognizes the travel environment around the vehicle A based on the detection information acquired from the periphery monitoring sensor 40. The environment recognition unit 63 provides the ACC control unit 64 and the LTA control unit 65 with a result of detection information analysis executed for travel environment recognition as analyzed detection information. As an example, the environment recognition unit 63 generates information (lane information) indicating relative positions and shapes of the left and right lane markings or road edges of a lane in which the vehicle A is currently traveling (hereinafter referred to as a current lane) as the analyzed detection information. The environment recognition unit 63 generates information (preceding vehicle information) indicating whether there is a preceding vehicle that precedes the vehicle A in the current lane, and when there is a preceding vehicle, a position and a speed of the preceding vehicle, as the analyzed detection information. The environment recognition unit 63 sequentially provides the preceding vehicle information to the ACC control unit 64 and sequentially provides the lane information to the LTA control unit 65. The environment recognition unit 63 may be configured to recognize MD areas, AD areas, periphery monitoring unnecessary sections, and periphery monitoring necessary sections, which will be described later.

Based on the preceding vehicle information, the ACC control unit 64 executes constant speed travel of the vehicle A at a target speed or adaptive cruise control (ACC) control for realizing following travel with respect to the preceding vehicle. The LTA control unit 65 executes lane tracing assist (LTA) control to keep the vehicle A travel in the lane based on the lane information. Specifically, each of the control units 64 and 65 generates control commands for acceleration and deceleration or a steering angle, and sequentially provides the control commands to the vehicle control ECU 80 that will be described later. The ACC control is an example of longitudinal control, and the LTA control is an example of lateral control.

The first autonomous driving ECU 60 realizes level 2 autonomous driving by executing both the ACC control and the LTA control. The first autonomous driving ECU 60 may be capable of realizing level 1 autonomous driving by executing either one of the ACC control and the LTA control.

On the other hand, the second autonomous driving ECU 70 enables autonomous travel control at level 3 or higher in the autonomous driving levels described above. That is, the second autonomous driving ECU 70 enables autonomous driving in which the driver is permitted to stop monitoring the periphery. In other words, the second autonomous driving ECU 70 enables autonomous driving in which a second task is permitted.

The second task is an action other than driving that is permitted to the driver, and is a predetermined specific action. In an autonomous travel period in which the vehicle A is automatically traveling based on the level 3 autonomous driving function by the second autonomous driving ECU 70, a driver in this case is a person (occupant) who takes over the control right of driving from the autonomous driving system when the vehicle A is exiting a limited region or in an emergency. The driver may be legally permitted to execute the second task until a request to execute a driving operation from the autonomous driving system, that is, a request for driving change (take over request) is generated.

The second task may be called a secondary activity or other activity, or the like. The second task must not prevent the driver from responding to a request to take over a driving operation from the autonomous driving system. As an example, actions such as watching contents such as moving images, operating smartphones, reading books, and eating are assumed as second tasks.

The autonomous driving program stored in the memory 71 causes the processor 72 to execute multiple instructions, and thus the second autonomous driving ECU 70 constructs multiple function units that realize the above-described autonomous driving. Specifically, the second autonomous driving ECU 70 constructs an environment recognition unit 73, an action planning unit 74, a trajectory generation unit 75, and the like as function units.

The environment recognition unit 73 recognizes a travel environment around the vehicle A based on the detection information acquired from the periphery monitoring sensor 40, the subject vehicle position and map data acquired from the locator ECU 34, the communication information acquired from the in-vehicle communication device 50, and the like. As an example, the environment recognition unit 73 recognizes a position of the current lane of the vehicle A, a shape of the current lane, relative positions and relative speeds of moving objects around the vehicle A, and the like. The environment recognition unit 73 sequentially provides the above recognition results to the action planning unit 74 and the trajectory generation unit 75.

The environment recognition unit 73 distinguishes between a manual driving area (MD area) and an autonomous driving area (AD area) in the travel area of the vehicle A, and sequentially provides the recognition results to the HCU 100.

The MD area is an area where autonomous driving is prohibited. In other words, the MD area is an area defined for the driver to execute all of longitudinal control, lateral control and periphery monitoring of vehicle A. For example, the MD area is an area where the traveling road is a general road.

The AD area is an area where autonomous driving is permitted. In the following description, it is assumed that at least autonomous driving level 3 is permitted in the AD area. In other words, the AD area is an area in which the vehicle A can substitute for one or more of longitudinal control, lateral control, and periphery monitoring. The AD area is assumed to be a predefined area. The environment recognition unit 73 distinguishes between the AD area and the MD area based on the map data. For example, the AD area is an area where a traveling road is an expressway or a motorway.

The AD area is divided into a section in which autonomous driving at level 2 or lower is possible (periphery monitoring necessary section) and a section in which autonomous driving at level 3 or higher is possible (periphery monitoring unnecessary section). The periphery monitoring necessary section is, for example, a section defined based on a road structure, such as a merging section and a branch section. The periphery monitoring unnecessary section is a section other than the periphery monitoring necessary section in the AD area, and in particular, a straight section is included in the periphery monitoring unnecessary section.

The environment recognition unit 73 determines whether the vehicle A is involved in traffic congestion. The environment recognition unit 73 determines that the vehicle A is involved in traffic congestion when a traveling speed of the vehicle A continues within a threshold range for a predetermined period. Alternatively, the environment recognition unit 73 may combine a position of the subject vehicle and congestion information acquired from the in-vehicle communication device 50 to determine whether the vehicle is involved in traffic congestion. The environment recognition unit 73 may use detection information from the periphery monitoring sensor 40 to determine whether the vehicle is involved in traffic congestion.

The action planning unit 74 plans a future action scheduled for the vehicle A based on the recognition result of the travel environment. Specifically, when the action planning unit 74 acquires an instruction to start autonomous driving in cooperation with the HCU 100 that will be described later, the action planning unit 74 determines the type of action that the vehicle A is to take in order to arrive at a destination as the future action. Future actions include, for example, going straight, turning right, turning left, and changing lanes. When the action planning unit 74 determines that it is necessary to transfer the driving control right to the driver, a take-over request is generated and provided to the HCU 100.

The trajectory generation unit 75 generates a travel trajectory for the vehicle A in sections where autonomous driving can be executed, based on the recognition result of the travel environment and the determined future action. The travel trajectory includes, for example, a target position of the vehicle A according to progress and a target speed at each target position. The trajectory generation unit 75 sequentially provides the generated travel trajectory to the vehicle control ECU 80 as control commands to be followed by the vehicle A during autonomous travel.

The autonomous driving system including the autonomous driving ECUs 60 and 70 described above enables the vehicle A to execute autonomous driving corresponding to at least level 2 and level 3.

The vehicle control ECU 80 is an electronic control device that executes acceleration and deceleration control and steering control of the vehicle A. The vehicle control ECU 80 includes a steering ECU that executes steering control, a power unit control ECU and a brake ECU that execute acceleration and deceleration control, and the like. The vehicle control ECU 80 acquires detection signals output from respective sensors such as a steering angle sensor and a vehicle speed sensor mounted on the vehicle A, and outputs control signals to respective travel control devices such as an electronic control throttle, a brake actuator, and an electric power steering (EPS) motor. The vehicle control ECU 80 acquires a control instruction for the vehicle A from the first autonomous driving ECU 60 or the second autonomous driving ECU 70, and thus controls each travel control device to realize autonomous travel according to the control instruction.

The vehicle control ECU 80 is also connected to a vehicle-mounted sensor 81 that detects information regarding a driving manipulation on a driving member executed by the driver. The vehicle-mounted sensor 81 includes, for example, a pedal sensor that detects a depression amount of an accelerator pedal, and a steering sensor that detects a steering amount of a steering wheel. The vehicle-mounted sensor 81 may include a gripping sensor that detects gripping of the steering wheel. The vehicle control ECU 80 sequentially provides the detected driving manipulation information to the HCU 100.

The DSM 27 includes a near-infrared light source, a near-infrared camera, and a control unit that controls the constituents. The DSM 27 is installed, for example, on an upper surface of a steering column portion or an upper surface of an instrument panel 9 in a posture in which the near-infrared camera faces a headrest portion of a driver's seat. The DSM 27 uses the near-infrared camera to image the driver's head irradiated with near-infrared light from the near-infrared light source. An image captured by the near-infrared camera is image-analyzed by the control unit. The control unit extracts information such as the driver's eye point position and sight line direction from the captured image, and provides the extracted driver state information to the HCU 100 and the like via the communication bus 99.

The details of each of the multiple display devices, audio device 24, the operation device 26, and the HCU 100 included in the HMI system will now be described.

The multiple display devices include a head-up display (hereinafter referred to as a HUD) 21, a meter display 22, a center information display (hereinafter referred to as a CID) 23, and the like. The multiple display devices may further include respective displays EMB, EML, and EMR of the electronic mirror system shown in FIG. 3. The HUD 21, the meter display 22, and the CID 23 are display devices that present image contents such as still images or moving images to the driver as visual information.

The HUD 21 projects light of an image formed in front of the driver onto a projection region PA defined on a windshield WS or the like based on control signals and image data acquired from the HCU 100. The light of the image reflected by the windshield WS to the inside of the vehicle compartment is perceived by the driver sitting on the driver's seat. Thus, the HUD 21 displays a virtual image in the space ahead of the projection region PA. The driver superimposes the virtual image within an angle of view VA displayed by the HUD 21 on the foreground of the vehicle A and visually recognizes the virtual image.

The meter display 22 and the CID 23 mainly include, for example, a liquid crystal display or an organic light emitting diode (OLED) display. The meter display 22 and the CID 23 display various images on display screens based on control signals and image data acquired from the HCU 100. The meter display 22 is installed, for example, in front of the driver's seat. The CID 23 is provided in the central region in the vehicle width direction in front of the driver. For example, the CID 23 is installed above the center cluster in the instrument panel 9. The CID 23 has a touch panel function, and detects, for example, touch operations and swipe operations on the display screen executed by the driver or the like. The CID 23 is an example of a "central display device".

The audio device 24 has multiple speakers installed inside the vehicle compartment. The audio device 24 presents a notification sound, a voice message, or the like to the driver as auditory information based on control signals and audio data acquired from the HCU 100. That is, the audio device 24 is an information presenting device capable of presenting information in a form different from visual information.

The operation device 26 is an input unit that receives a user operation made by the driver or the like. The operation device 26 receives, for example, user operations related to starting and stopping each level of the autonomous driving function. The operation device 26 includes, for example, a steering switch provided on a spoke portion of the steering wheel, an operation lever provided on a steering column portion, and a voice input device for recognizing the content of the driver's speech.

The HCU 100 controls presentation of information to the driver based on information from the first autonomous driving ECU 60, the second autonomous driving ECU 70, and the like. The HCU 100 mainly includes a computer having a memory 101, a processor 102, an input-output interface, and a bus connecting these constituents. The processor 102 is hardware for calculation processing. The processor 102 includes, as a core, at least one of a central processing unit (CPU), a graphics processing unit (GPU), and a reduced instruction set computer (RISC)-CPU.

The memory 101 stores or records computer-readable programs, data, and the like in a non-transitory manner, and is at least one type of non-transitory tangible storage medium among a semiconductor memory, a magnetic medium, and an optical medium. The memory 101 stores various programs executed by the processor 102, such as a presentation control program that will be described later.

The processor 102 executes multiple instructions included in a presentation control program stored in the memory 101. Accordingly, the HCU 100 constructs multiple function units for controlling presentation to the driver. Thus, in the HCU 100, the presentation control program stored in the memory 101 causes the processor 102 to execute multiple instructions, and thus constructs multiple function units. Specifically, in the HCU 100, as shown in FIG. 2, function units such as a periphery state ascertaining unit 110, a driving state control unit 120, a driver state estimation unit 130, and a presentation information adjustment unit 140 are constructed.

The periphery state ascertaining unit 110 acquires a travel environment recognition result from the environment recognition unit 63 of the first autonomous driving ECU 60 or the environment recognition unit 73 of the second autonomous driving ECU 70. The periphery state ascertaining unit 110 ascertains the periphery state of the vehicle A based on the acquired recognition result. Specifically, the periphery state ascertaining unit 110 ascertains whether the vehicle is approaching the AD area, entering the AD area, or is involved in traffic congestion. The periphery state ascertaining unit 110 sequentially provides the ascertained periphery state information to the driving state control unit 120. The periphery state ascertaining unit 110 may ascertain a periphery state based on information directly obtained from the locator ECU 34, the periphery monitoring sensor 40, or the like, instead of the recognition results acquired from the autonomous driving ECUs 60 and 70.

The driver state estimation unit 130 estimates a driver state based on information from the DSM 27, the vehicle control ECU 80, and the like. For example, the driver state estimation unit 130 estimates whether each body part of the driver is involved in the driving motion as the driver state. Specifically, the driver state estimation unit 130 determines whether the driver's eyes are monitoring the periphery based on state information regarding the sight line direction of the driver acquired from the DSM 27. The driver state estimation unit 130 determines whether the driver is gripping the steering wheel with the hands based on the steering amount acquired from the vehicle control ECU 80. That is, the driver state estimation unit 130 distinguishes between a hands-on state in which the driver grips the steering wheel and a hands-off state in which the driver stops gripping the steering wheel. The driver state estimation unit 130 may distinguish between the hands-on state and the hands-off state based on detection information from the gripping sensor or the like. The driver state estimation unit 130 sequentially provides the estimated driver state to the driving state control unit 120.

The driver state estimation unit 130 estimates the driver's readiness. The readiness is readiness of the driver for autonomous driving. The readiness can also be said to be a standard for measuring whether autonomous driving is ready to be permitted for the driver.

The driver state estimation unit 130 divides the driver's readiness into multiple levels. For example, the driver state estimation unit 130 divides the readiness into an acceptable level at which the driver is ready for at least autonomous driving at level 3 and an unacceptable level at which the driver is not ready for autonomous driving at level 3 or higher. The driver state estimation unit 130 divides the unacceptable levels into an unacceptable level 1 at which the driver is ready for autonomous driving at level 2 and an unacceptable level 2 at which the driver is not ready for autonomous driving at any level.

The driver state estimation unit 130 estimates the readiness according to the driver's driving motion, particularly the degree of concentration on monitoring the periphery. Specifically, the driver state estimation unit 130 estimates the readiness according to the degree of distraction, thinking, and arousal. Based on the state information from the DSM 27, the driver state estimation unit 130 determines the degree of distraction, thinking, and arousal. For example, the driver state estimation unit 130 makes a determination regarding distraction based on a sight line direction of the driver. The driver state estimation unit 130 makes a determination regarding thinking based on the number of times the driver blinks, a sight line direction, and the degree of opening of the eyelids. The driver state estimation unit 130 makes a determination regarding arousal based on the degree of opening of the eyelids and the like.

As an example, the driver state estimation unit 130 estimates that the readiness is at an acceptable level when it is determined that the driver is not distracted and thinking, or the degree of these is within the acceptable range and the driver is in an awake state. When the driver state estimation unit 130 determines that the degree of distraction and thinking is outside the acceptable range and is within level 1, which is larger than the acceptable range, it is estimated that the readiness is at unacceptable level 1. The driver state estimation unit 130 estimates that the readiness is at unacceptable level 2 when it is determined that the degree of distraction and thinking is outside the level 1 range.

The driver state estimation unit 130 accumulates driver state data during manual driving as reference data for estimating readiness. The driver state estimation unit 130 specifies the driver seated on the driver's seat, and when there is state data accumulated up to the previous time, the data is diverted. The driver may be specified by extracting physical characteristics of the driver or through personal authentication based on the driver's input or the like.

The driver state estimation unit 130 accumulates imaging data for a predetermined time during manual driving as reference data. The driver state estimation unit 130 accumulates imaging data for the same measurement time as determination state data during autonomous driving. The driver state estimation unit 130 estimates the readiness by comparing the reference data with determination target data.

The driver state estimation unit 130 determines whether previous determination state data can be used to estimate the current readiness when the previous autonomous driving temporarily shifts to manual driving and then shifts to the current autonomous driving. In particular, the driver state estimation unit 130 executes the above-described determination when a shift to the manual driving mode is executed due to the inability to acquire state data, such as the DSM 27 not being able to detect the sight line. Specifically, the driver state estimation unit 130 determines whether a length of the period of manual driving state is within an acceptable range. When it is determined that the length is within the acceptable range, the driver state estimation unit 130 uses the previous determination state data to estimate the current readiness.

The driver state estimation unit 130 determines whether the readiness is at the acceptable level or unacceptable level 1 during the previous state data measurement period. Even when the driver state estimation unit 130 determines that the readiness is at the acceptable level, the driver state estimation unit 130 uses the previous determination state data to estimate the current readiness.

For example, the driver state estimation unit 130 determines the measurement time of the current determination state data based on the measurement time of the previous determination state data. Specifically, the driver state estimation unit 130 sets the measurement time of the current determination state data such that a sum of the previous measurement time and the current measurement time is an accumulation time. The driver state estimation unit 130 may reset the accumulation of imaging data when a posture or a behavior of the driver changes significantly when a shift to manual driving is executed. The driver state estimation unit 130 sequentially provides the estimated readiness to the driving state control unit 120.

On the other hand, when the driver state estimation unit 130 determines that the length of the period of the manual driving state is outside the acceptable range, or that the readiness is at unacceptable level 1 during the previous state data measurement period, the previous determination state data is not used to estimate the current readiness. In this case, the driver state estimation unit 130 measures the current state data and uses only the state data to estimate the readiness.

The driving state control unit 120 controls changes of a state of autonomous driving in cooperation with the second autonomous driving ECU 70 and the first autonomous driving ECU 60.

Specifically, the driving state control unit 120 controls permission of a switch in an autonomous driving level and a switch to the permitted autonomous driving level. In particular, the driving state control unit 120 controls a switch between autonomous driving level 2 and autonomous driving level 3 in the AD area. Since the right to control a driving operation differs between autonomous driving level 2 and level 3, it can be said that the driving state control unit 120 controls driving change. The driving state control unit 120 controls an autonomous driving level based on the driver's readiness. Specifically, the driving state control unit 120 determines an autonomous driving level that is a switch destination based on the readiness at the autonomous driving level before a switch.

Control of a level switch from autonomous driving level 2 to level 3 will be described. In this case, the driving state control unit 120 requests the driver to execute hands-off at autonomous driving level 2, and then permits a switch to autonomous driving level 3. Specifically, first, the driving state control unit 120 determines whether the readiness is at the acceptable level in the hands-on state of autonomous driving level 2.

When it is determined that the readiness is at the acceptable level, the driving state control unit 120 generates hands-off possible information. The driving state control unit 120 provides hands-off possible information to the presentation information adjustment unit 140. After a hands-off possible notification (that will be described later) is provided from the presentation information adjustment unit 140 that has acquired the hands-off possible information, the driving state control unit 120 determines whether the driver has executed hands-off based on the driver state information. The driving state control unit 120 maintains the hands-on state of autonomous driving level 2 when it is determined that the readiness is at unacceptable level 1. When it is determined that the readiness is at unacceptable level 2, the driving state control unit 120 determines a switch to autonomous driving level 0, that is, the manual driving mode.

When it is determined that the hands-off has been executed, the driving state control unit 120 again determines whether the readiness is at the acceptable level under the hands-off state. When it is determined that the readiness is at the acceptable level, the driving state control unit 120 permits a switch from autonomous driving level 2 to level 3. In this case, the driving state control unit 120 generates level 3 possible information. The driving state control unit 120 provides level 3 possible information to presentation information adjustment unit 140. After the level 3 possible notification (described later) by the presentation information adjustment unit 140 that has acquired the level 3 possible information, the driving state control unit 120 determines whether an instruction to execute autonomous driving level 3 has been acquired from the driver.

When the driving state control unit 120 determines that an execution instruction for autonomous driving level 3 has been acquired, the driving state control unit 120 starts executing autonomous driving level 3. In this case, the driving state control unit 120 generates second task possible information and provides the second task possible information to the presentation information adjustment unit 140.

On the other hand, the driving state control unit 120 determines a switch to the hands-on state of autonomous driving level 2 when it is determined that the readiness is at unacceptable level 1 in the hands-off state of autonomous driving level 2. In this case, the driving state control unit 120 generates hands-on shift information and provides the hands-on shift information to the presentation information adjustment unit 140. When it is determined that the readiness is at unacceptable level 2 under the hands-off state of autonomous driving level 2, the driving state control unit 120 determines a switch to autonomous driving level 0, that is, the manual driving mode. In this case, the driving state control unit 120 generates manual driving shift information and provides the manual driving shift information to the presentation information adjustment unit 140.

Next, control of a switch from autonomous driving level 3 to level 2 will be described. The driving state control unit 120 determines a switch from autonomous driving level 3 to level 2 when the vehicle A moves from the periphery monitoring unnecessary section to the periphery monitoring necessary section, or when the vehicle A deviates from a traffic congestion vehicle line. When a switch to autonomous driving level 2 is determined, the driving state control unit 120 determines whether hands-off can be permitted after a switch.

When it is determined that hands-off can be permitted after a switch to autonomous driving level 2, the driving state control unit 120 requests the driver to execute hands-on, and then perm its hands-off at autonomous driving level 2. Specifically, when the driving state control unit 120 determines a switch from autonomous driving level 3 to level 2, first, level 2 switch information is generated and provided to the presentation information adjustment unit 140. After a driving change notification (that will be described later) is provided from the presentation information adjustment unit 140 that has acquired the level 2 switch information, the driving state control unit 120 determines whether a shift to the hands-on state has been executed before a switch to autonomous driving level 2. Since a switch from autonomous driving level 3 to level 2 may occur due to an external factor such as elimination of traffic congestion, there is a high possibility that a relatively large vehicle behavior will occur. Therefore, the driving state control unit 120 prepares for manual driving in an emergency by requesting the driver to grip the steering wheel as described above.

When it is determined that the shift to the hands-on state has been executed, the driving state control unit 120 determines the readiness under the hands-on state. When the readiness is at the acceptable level under the hands-on state, the driving state control unit 120 perm its hands-off at autonomous driving level 2. In this case, the driving state control unit 120 generates hands-off possible information and provides the hands-off possible information to the presentation information adjustment unit 140. When a hands-off motion is detected after a hands-off possible notification (that will be described later) is provided from the presentation information adjustment unit 140 that has acquired the hands-off possible information, the driving state control unit 120 determines that a shift to the hands-off state has been executed.

The driving state control unit 120 permits hands-off at autonomous driving level 2 even when the readiness is at unacceptable level 1 under the hands-on state. In this case, the driving state control unit 120 provides unacceptable level 1 information to the presentation information adjustment unit 140. However, the driving state control unit 120 prohibits autonomous driving level 2 when the readiness is at unacceptable level 2 under the hands-on state. In this case, the driving state control unit 120 determines a shift to the manual driving mode, generates manual driving switch information, and provides the manual driving switch information to the presentation information adjustment unit 140.

The driving state control unit 120 requests the driver to execute hands-on during a switch from autonomous driving level 3 to level 2 described above as a motion recommended at the time of a switch. Therefore, even when it is determined that a shift to the hands-on state has not been executed before a switch to autonomous driving level 2 after the driving change notification, that is, a switch to level 2 has been executed in the hands-off state, the driving state control unit 120 permits the hands-off state of autonomous driving level 2.

When the driving state control unit 120 acquires an instruction to execute autonomous driving level 3 from the driver in a state in which a switch to autonomous driving level 3 is permitted, the driving state control unit 120 actually executes a switch from autonomous driving level 2 to autonomous driving level 3.

When the driving state control unit 120 determines to permit autonomous driving at level 2, it is determined whether hands-off at level 2 is permitted. Specifically, the driving state control unit 120 determines to permit hands-off when specific conditions are established based on an LTA execution state, the presence or absence of high definition map data around vehicle A, a lane state, a state of monitoring periphery of the driver, a road shape around vehicle A, and the like.

The specific conditions include, for example, that LTA control is being executed, that there is high definition map data around vehicle A, and that at least one of the left and right lane markings of the current lane can be detected. The specific conditions include that it is possible to determine that the driver is monitoring the periphery, and that a travel section is not a section with a complicated road structure. The section with a complicated road structure is, for example, a merging section and a branch section. The driving state control unit 120 may determine to permit hands-off when one or more of the above conditions is established.

The driving state control unit 120 determines an autonomous driving level to be actually executed based on the currently permitted autonomous driving level, the state information of the driver, the input information to the operation device 26, and the like. That is, when an instruction to start the currently permitted autonomous driving level is acquired as input information, the driving state control unit 120 determines to execute the autonomous driving level. However, the driving state control unit 120 determines to execute level 3 without acquiring input information when autonomous driving at level 3 is permitted while autonomous driving at level 2 is being executed and under a hands-on state.

The presentation information adjustment unit 140 controls presentation of contents related to autonomous driving based on information acquired from the periphery state ascertaining unit 110, the driving state control unit 120, and the driver state estimation unit 130.

Specifically, first, the presentation information adjustment unit 140 selects contents to be presented by each presentation device based on various types of information. The presentation information adjustment unit 140 adjusts contents to be displayed on each display device. Specifically, the presentation information adjustment unit 140 comprehensively determines the priority of each piece of contents based on various types of information, and selects contents determined to have a high priority as presentation target contents. The presentation information adjustment unit 140 may sequentially change a display size and a display layout of each piece of contents to be displayed on each display device according to priority. As an example, the presentation information adjustment unit 140 increases a display size of contents with a higher priority. As another example, the presentation information adjustment unit 140 locates contents having a higher priority on the near side of each display region.

The presentation information adjustment unit 140 generates a control signal and image data to be provided to each display device and a control signal and audio data to be provided to the audio device 24 based on the above selection results and adjustment results. The presentation information adjustment unit 140 outputs the generated control signal and each piece of data to each presentation device, and thus each presentation device presents information. The presentation information adjustment unit 140 is an example of a "permit state control unit".

Figure 9:
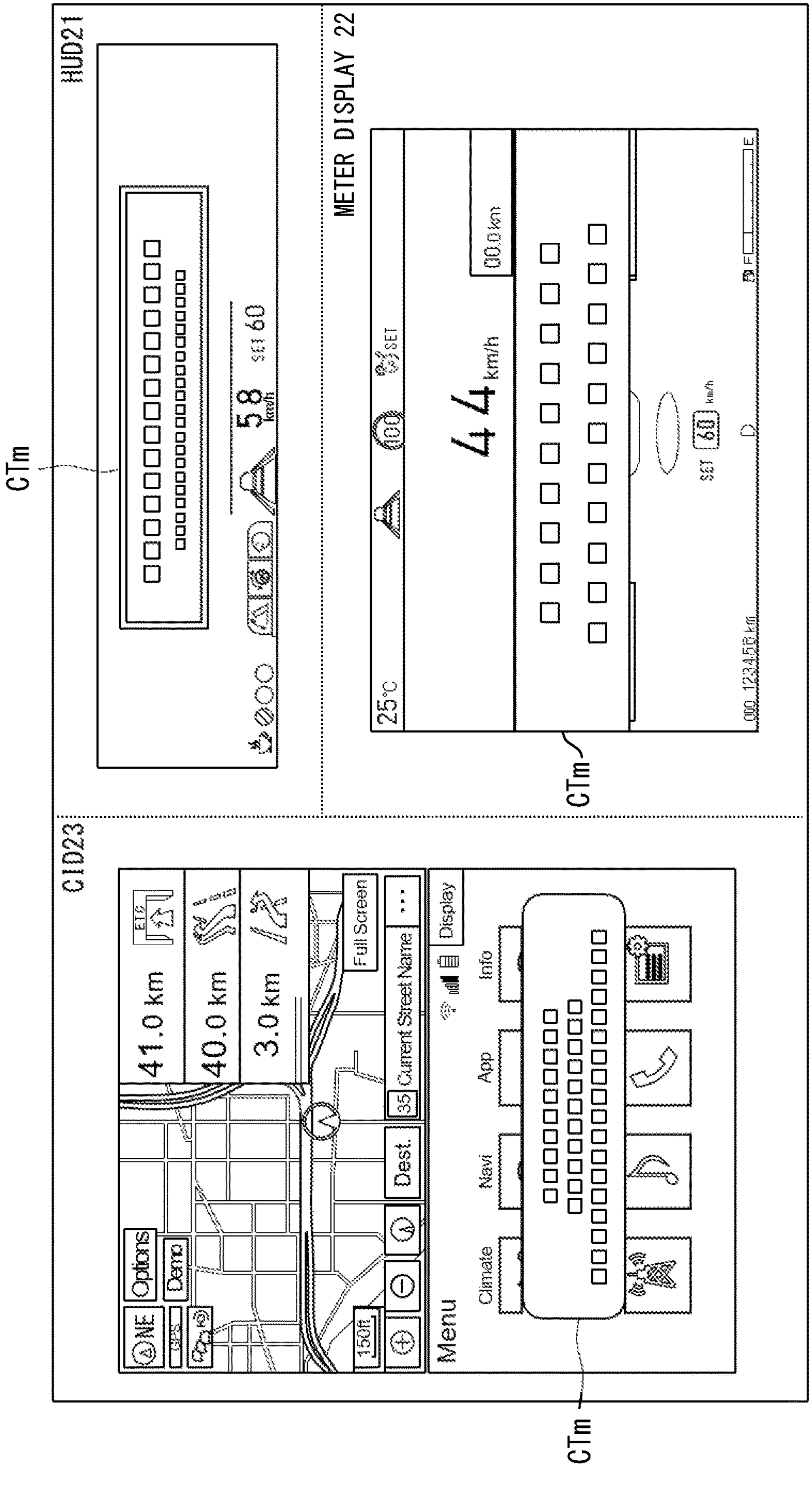
FIG. 9 is a diagram showing an example of information presentation.

Next, the contents presented by presentation information adjustment unit 140 will be described below with reference to FIG. 9. The HCU 100 executes a hands-off possible notification, a level 3 possible notification, a second task possible notification, a driving change notification, a hands-on request notification, a readiness failure notification, a readiness measuring notification, a manual driving shift notification, and the like in relation to autonomous driving.

The hands-off possible notification is presented based on the hands-off possible information. In the hands-off possible notification, for example, by displaying contents on the HUD 21 and the meter display 22, it is reported that the hands-off is possible. For example, message contents CTm is displayed on the HUD 21 and the meter display 22 in the hands-off possible notification. The message contents CTm includes text information such as "hands-off is now possible".

The level 3 possible notification is presented based on the level 3 possible information. In the level 3 possible notification, for example, it is reported that level 3 is possible by displaying contents on the HUD 21 and the meter display 22. For example, in the level 3 possible notification, the message contents CTm is displayed in the same manner as in the hands-off possible notification. In this case, the message contents CTm may include text information indicating that autonomous driving level 3 is possible, such as "autonomous driving level 3 is now possible" or "eyes-off is now possible". In the level 3 possible notification, the presentation information adjustment unit 140 displays a level 3 shift permission-prohibition button for inquiring of the driver whether a shift to level 3 is permitted. The presentation information adjustment unit 140 may display the level 3 shift permission-prohibition button by lighting an input portion of the corresponding operation device 26, or display the level 3 shift permission-prohibition button as contents on any of the display devices.

The second task possible notification is presented based on the second task possible information. In the second task possible notification, for example, it is reported that the second task is now possible by displaying contents on the HUD 21, the meter display 22, and the CID 23. For example, in the second task possible notification, the message contents CTm is displayed in the same manner as in the hands-off possible notification. In this case, the message contents CTm may include text information indicating that the second task is possible, such as "the second task is now possible".

The driving change notification is presented based on the level 2 switch information. In the driving change notification, for example, the driving change from the vehicle A to the driver is reported by displaying contents on the HUD 21, the meter display 22, and the CID 23. The driving change notification may also include a hands-on request notification for requesting the driver to execute hands-on. For example, in the driving change notification, the message contents CTm is displayed in the same manner as in the hands-off possible notification. In this case, the message contents CTm includes text information indicating that driving change is necessary, such as "please change driving" and "autonomous driving level 3 will be canceled", and text information for prompting hands-on, such as "please hold the steering wheel". Alternatively, the driving change notification and the hands-on request notification may be displayed separately in different pieces of message contents CTm. The hands-on request notification is presented together with the readiness failure notification that will be described later, even when the readiness is at unacceptable level 1 in a state in which a switch to autonomous driving level 3 is permitted when the readiness is at an acceptable level. The hands-on request notification is not executed during a switch from autonomous driving level 2 to level 3.

The readiness failure notification is presented based on the readiness information. In the readiness failure notification, for example, it is reported that the readiness has not reached the acceptable level by displaying contents on the HUD 21, the meter display 22, and the CID 23. In the readiness failure notification, the message contents CTm including text information indicating that the readiness has not reached the acceptable level is displayed.

In the readiness measuring notification, when the readiness is being measured, the fact is reported. Specifically, when the state data accumulated up to the previous time cannot be used for the current readiness estimation, that is, when state data necessary for estimating readiness is re-accumulated, the presentation information adjustment unit 140 provides the readiness measuring notification. The message contents CTm including text information indicating that the readiness is being measured is displayed in the readiness measuring notification.

The manual driving shift notification is presented based on the manual driving switch information from the driver state estimation unit 130. In the manual driving shift information, for example, a switch from autonomous driving to manual driving is reported by displaying contents on the HUD 21, the meter display 22, and the CID 23. In the manual driving shift notification, for example, the message contents CTm including text information indicating a switch to manual driving is displayed. The manual driving shift notification may also be expressed as a level 0 shift notification.

In one or more of the above notifications, visual contents other than text information, such as symbols and patterns, may be displayed. For example, in the hands-off possible notification and the hands-on request notification, details of each notification may be displayed by an icon resembling the steering wheel and the hands. Also, in one or more of the above notifications, information may be presented by sound, vibration, or the like instead of or in addition to displaying contents.

Next, a specific example of the a switch in an autonomous driving level and accompanying information presentation will be described with reference to the time charts of FIGS. 4 to 8.

Figure 4:
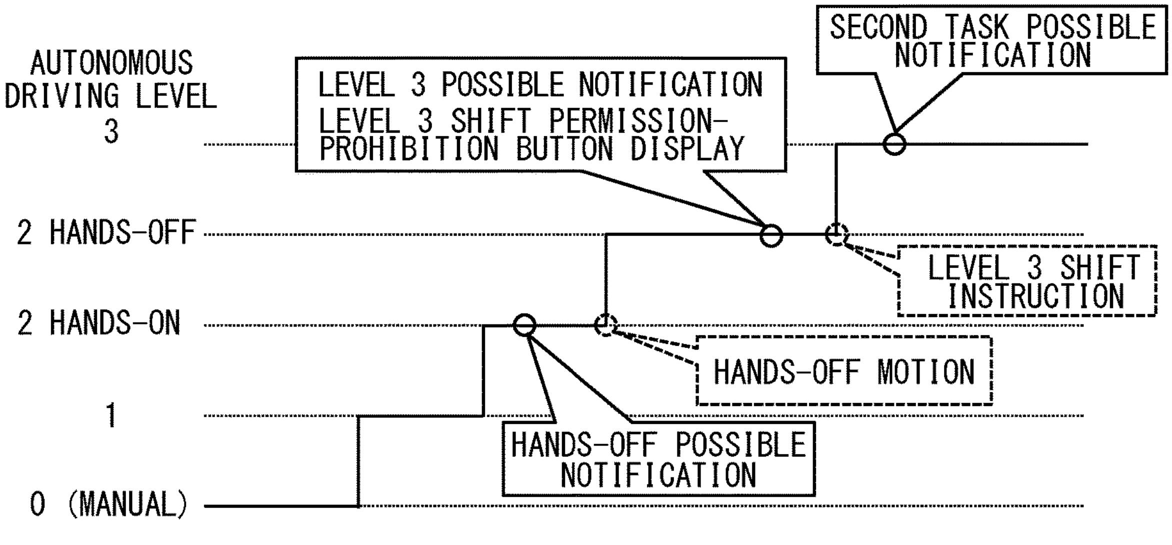
FIG. 4 is a time chart showing an example of a switch in an autonomous driving level.

FIG. 4 shows a switch from autonomous driving level 2 to level 3. In the example in FIG. 4, it is assumed that the readiness is always at an acceptable level. In this case, before a switch to autonomous driving level 3, the hands-off possible notification is provided in the hands-on state of autonomous driving level 2. Thereafter, when the driver shifts to the hands-off state due to a motion of the driver, the level 3 possible notification is provided. When the driver gives an instruction for a shift to level 3, a shift to autonomous driving level 3 is executed, and then the second task possible notification is provided.

Figure 5:
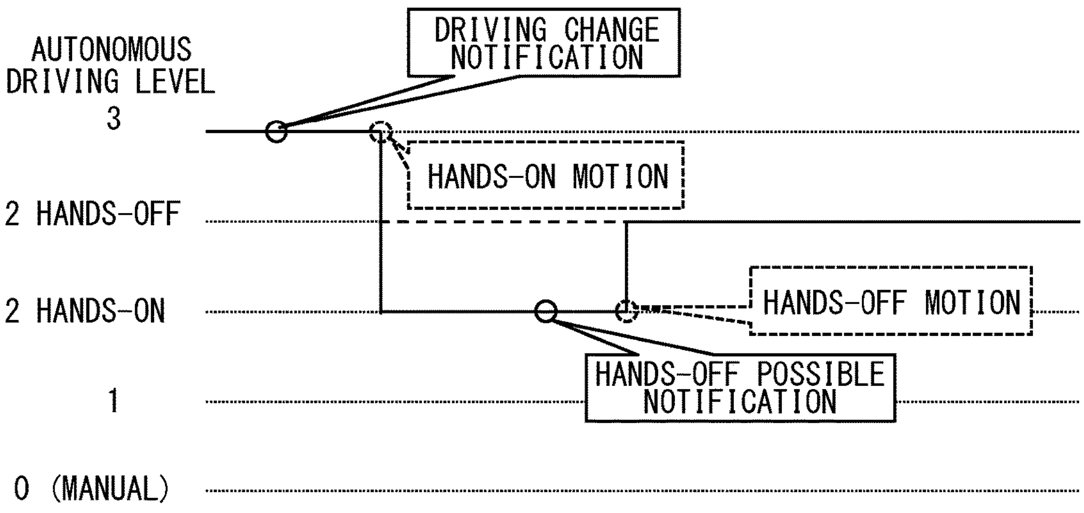
FIG. 5 is a time chart showing an example of a switch in an autonomous driving level.

FIG. 5 shows a switch from autonomous driving level 3 to level 2 at which hands-off is possible. In the example in FIG. 5, it is assumed that the readiness is always at an acceptable level. In this case, when a switch to autonomous driving level 2 is determined, first, the driving change notification is provided. The driving change notification includes the hands-on request notification as described above. When the driver executes a hands-on motion in response thereto, the hands-off possible notification is provided. When the driver receives the notification and executes a hands-off motion, a switch to the hands-off state of autonomous driving level 2 is executed. Even when the driver does not execute a hands-on motion after presentation of the driving change notification, a switch to autonomous driving level 2 is executed.

Figure 6:
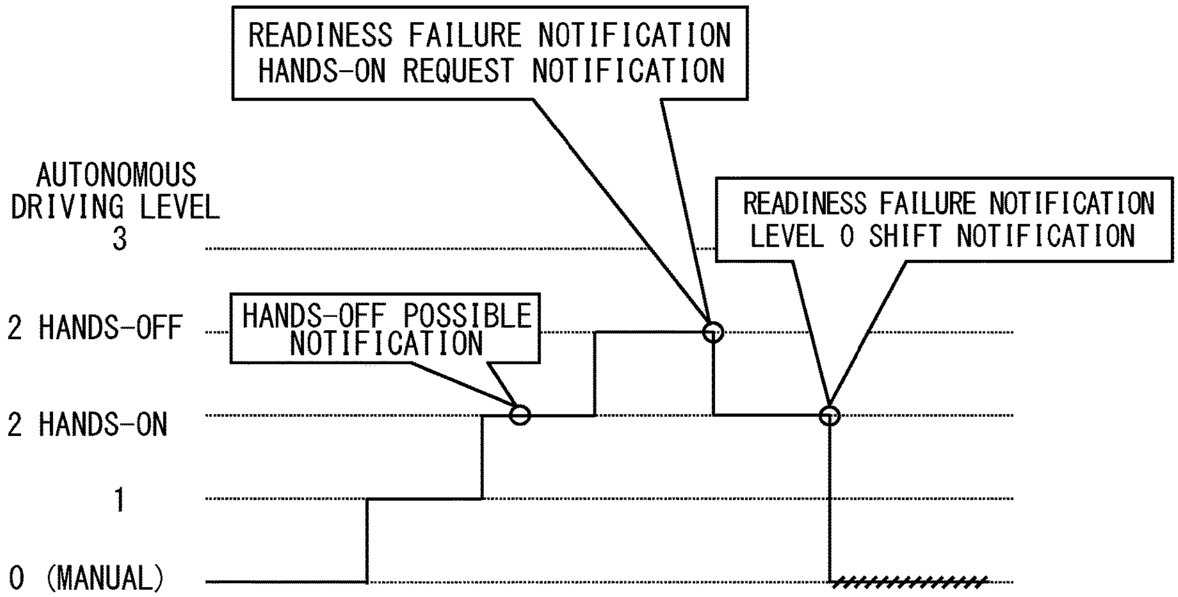
FIG. 6 is a time chart showing an example of a switch in an autonomous driving level.

FIG. 6 shows a case where the readiness is at unacceptable level 1 in the hands-off state of autonomous driving level 2. In the example in FIG. 6, it is assumed that the vehicle A enters a periphery monitoring unnecessary section or joins a traffic congestion line, and thus a switch to autonomous driving level 3 can be executed when the readiness is at an acceptable level. In this case, in the hands-off state of autonomous driving level 2, the readiness failure notification and the hands-on request notification are presented.

It is assumed that the readiness changes to unacceptable level 2 in the state of a switch to the hands-on state of autonomous driving level 2 after the above notification. In this case, after the readiness failure notification and the manual driving shift notification are presented, a switch to manual driving is executed.

Figure 7:
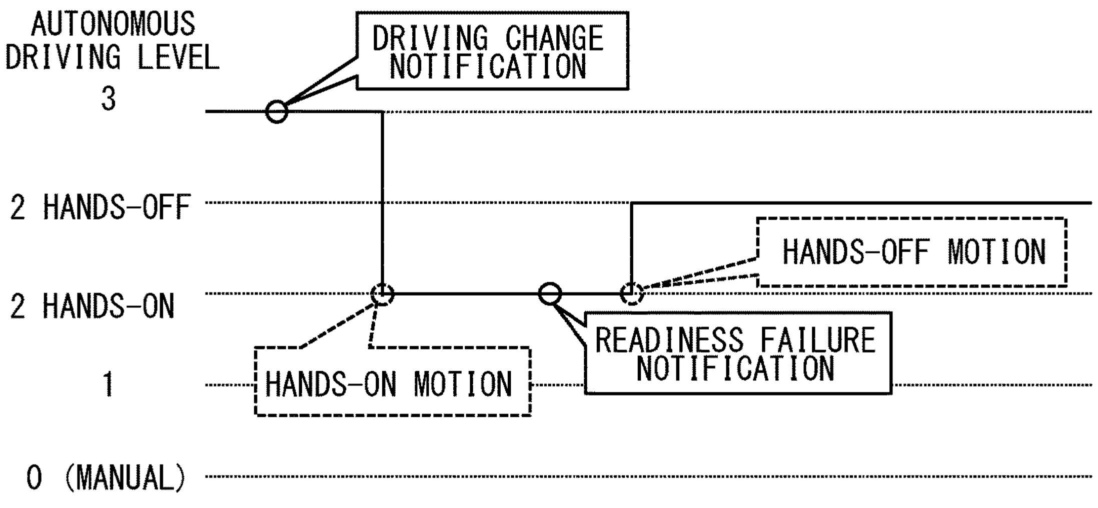
FIG. 7 is a time chart showing an example of a switch in an autonomous driving level.

FIG. 7 shows a case where the readiness changes to unacceptable level 1 after a shift from autonomous driving level 3 to the hands-on state of level 2. When the readiness changes to unacceptable level 1 in the hands-on state of level 2, the readiness failure notification is presented while the autonomous driving level is maintained.

Figure 8:
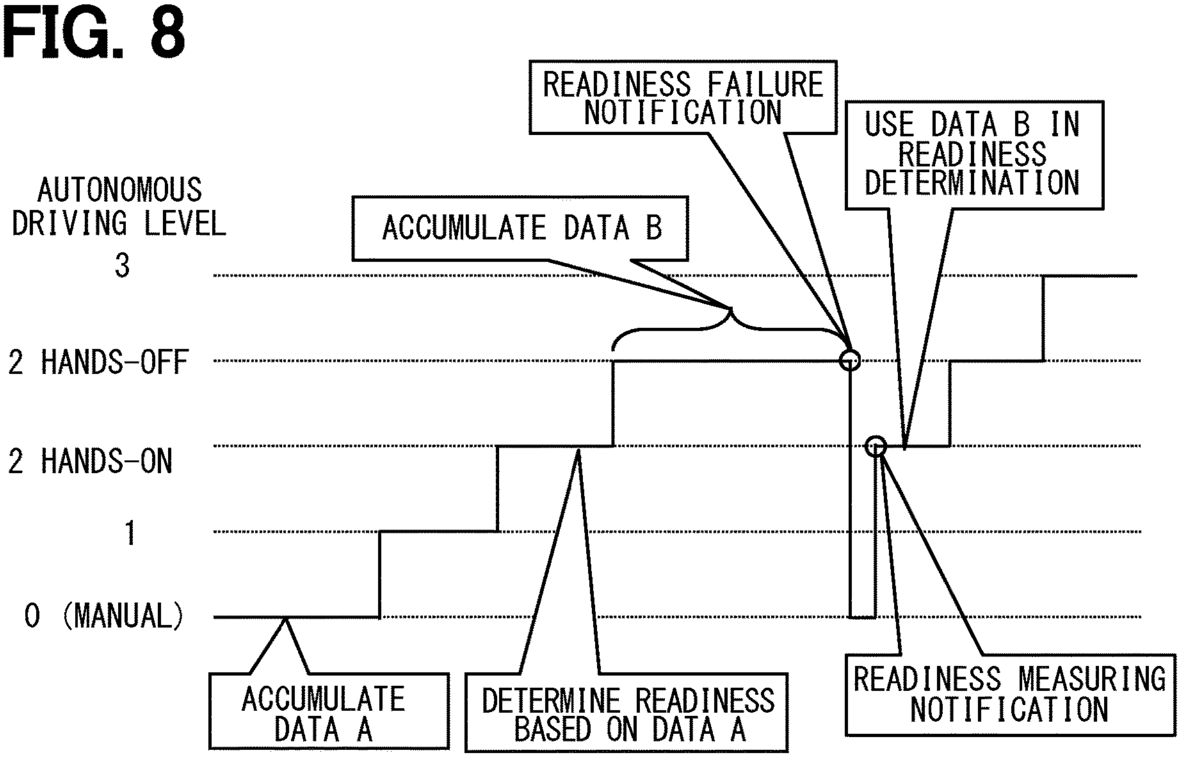
FIG. 8 is a time chart showing an example of a switch in an autonomous driving level.

FIG. 8 is a time chart regarding a method of measuring state data associated with a switch in the autonomous driving level. In the example in FIG. 8, it is assumed that the autonomous driving level changes in order from level 0 (manual driving) to the hands-off state of autonomous driving 2, and then temporarily switches to manual driving due to, for example, being unable to detect the sight line of the driver.

First, the driver state estimation unit 130 accumulates driver state data as reference data during manual driving. Thereafter, when a switch to the hands-on state of autonomous driving level 2 is executed, the driver state estimation unit 130 estimates the readiness based on the state data at this time and the reference data. When the readiness is at the acceptable level and a switch to the hands-on state of autonomous driving level 2 is executed, the driver state estimation unit 130 accumulates state data (data B) at this time as determination state data. In this case, when the sight line of the driver becomes undetectable, the presentation information adjustment unit 140 provides the readiness failure notification, and then the driving state control unit 120 executes a switch to manual driving.

Thereafter, when the sight line of the driver becomes detectable again, the driving state control unit 120 returns the autonomous driving level to the hands-on state of level 2. In this case, the driver state estimation unit 130 determines whether the data B, which is the previous state data, can be used. When it is determined that the data B cannot be used, the driver state estimation unit 130 starts accumulating the determination state data again, and the presentation information adjustment unit 140 executes the readiness measuring notification.

Figure 10:
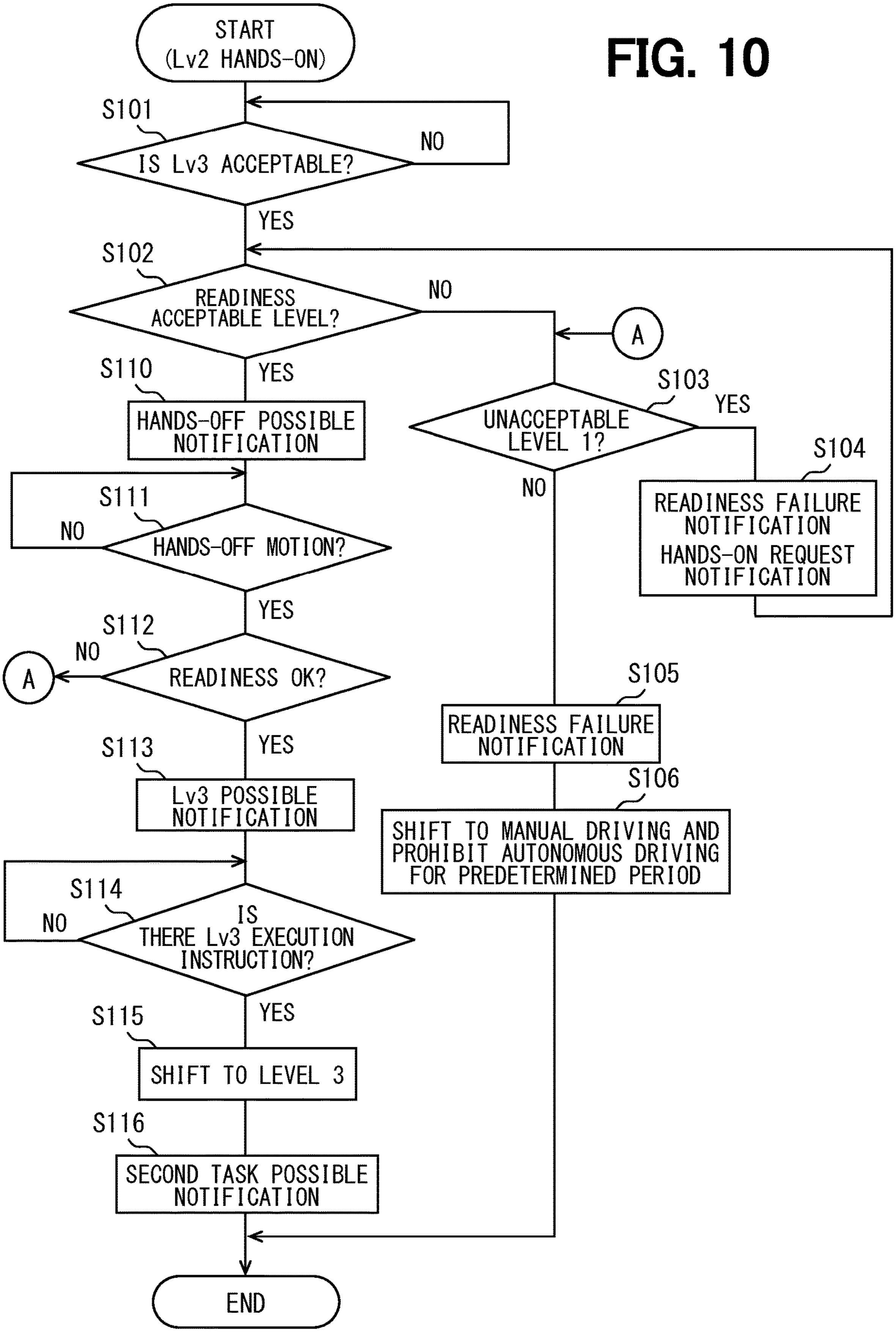
FIG. 10 is a flowchart showing an example of the presentation control method executed by the HCU.
Figure 11:
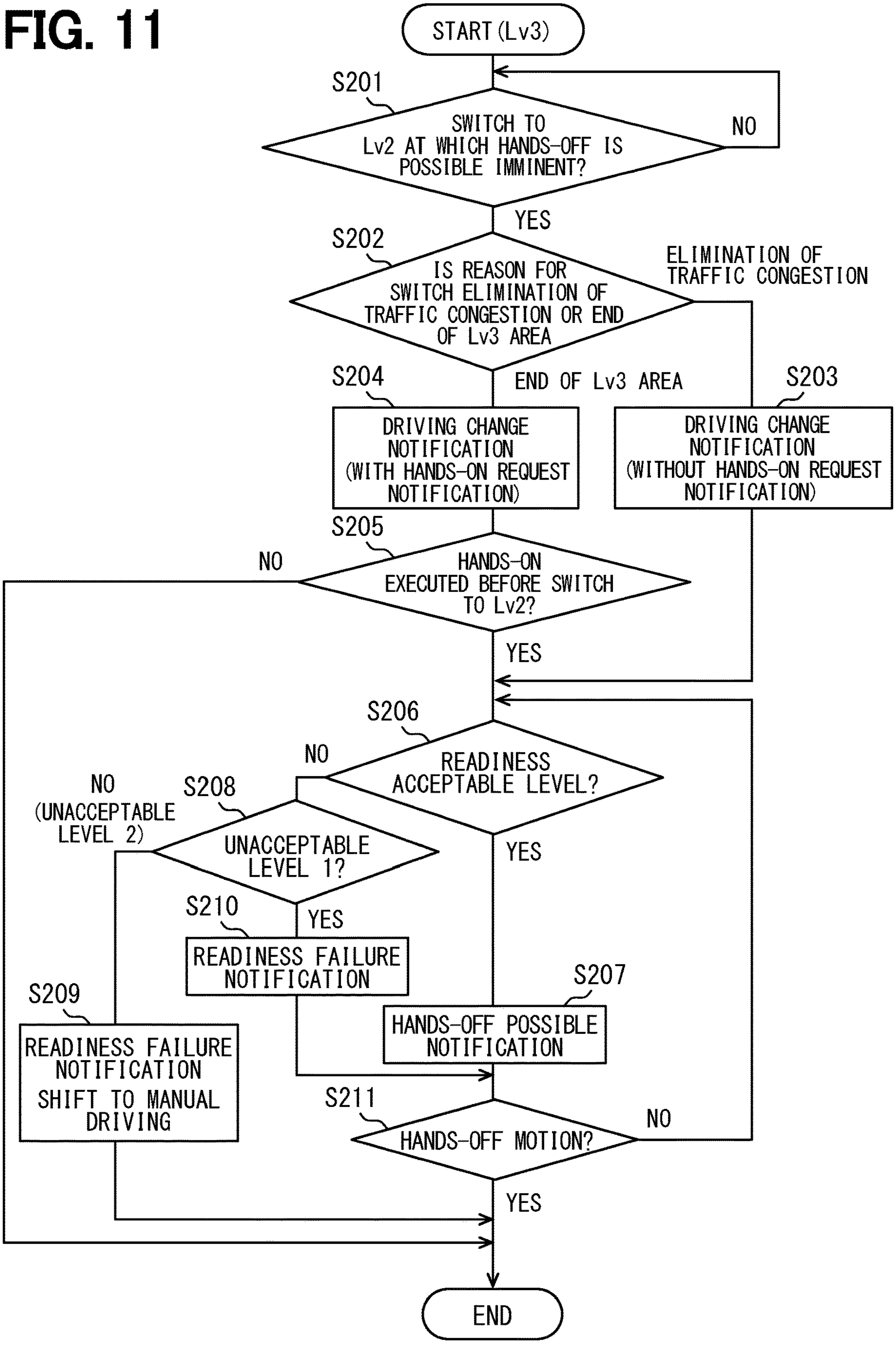
FIG. 11 is a flowchart showing an example of the presentation control method executed by the HCU.
Figure 12:
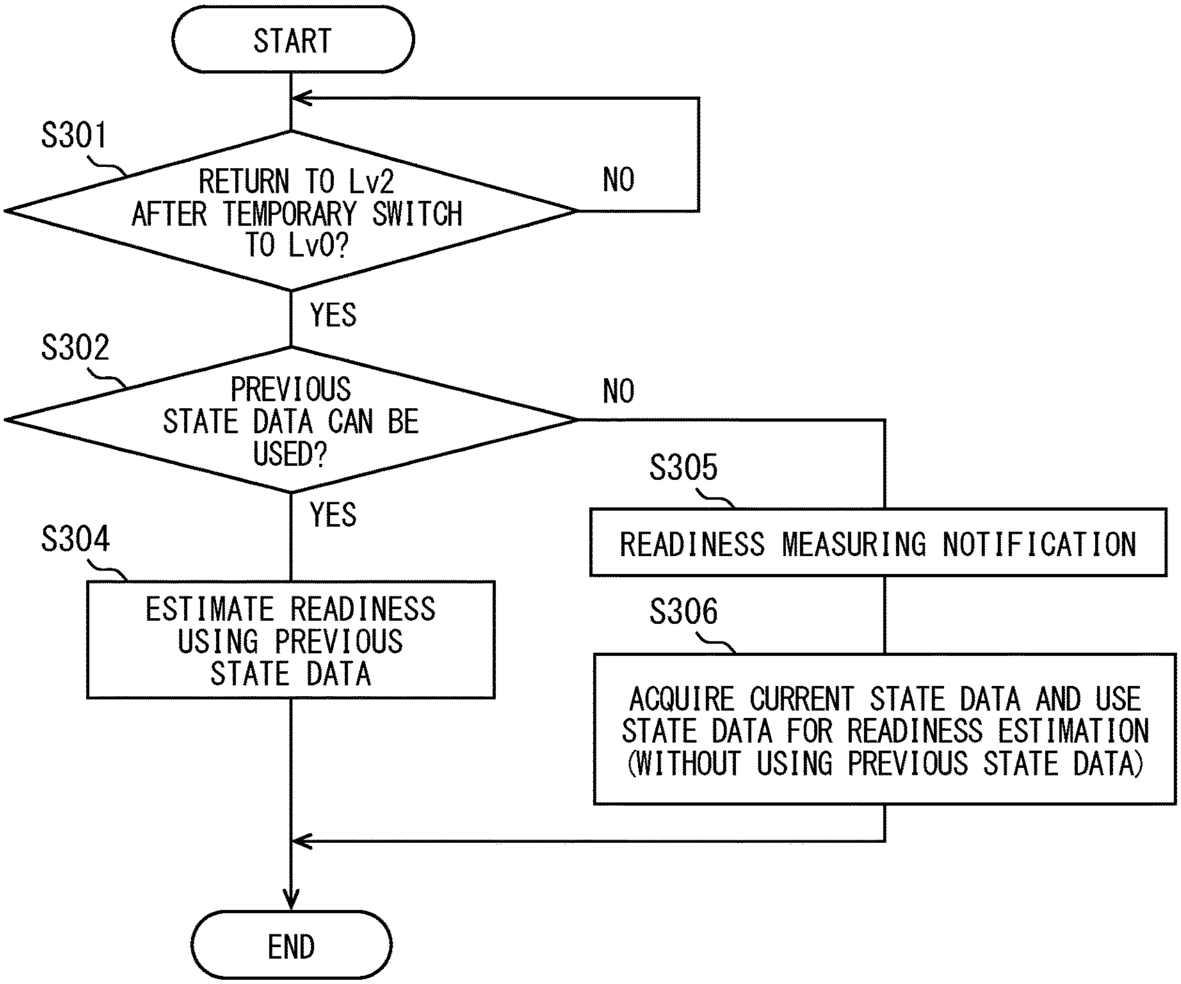
FIG. 12 is a flowchart showing an example of the presentation control method executed by the HCU.

Next, a flow of the presentation control method executed by the HCU 100 in cooperation with the functional blocks will be described below according to FIGS. 10 to 12. In the flow described later, "S" means multiple steps of the flow executed by multiple instructions included in the presentation control program.

First, a flow in a case of a switch from the hands-on state of autonomous driving level 2 to autonomous driving level 3 will be described. First, in S101 in FIG. 10, the driving state control unit 120 waits until autonomous driving level 3 becomes acceptable. When it is determined that autonomous driving level 3 becomes acceptable, in S102, the driver state estimation unit 130 determines whether the readiness is at the acceptable level.

When it is determined that the readiness is not at the acceptable level, the flow proceeds to S103, and the driver state estimation unit 130 determines whether the readiness is at unacceptable level 1. When it is determined that the readiness is at unacceptable level 1, in S104, the presentation information adjustment unit 140 executes the readiness failure notification and the hands-on request notification, and returns to S102. When it is determined in S103 that the readiness is not at unacceptable level 1, that is, unacceptable level 2, the flow proceeds to S105, and the presentation information adjustment unit 140 executes the readiness failure notification. Next, in S106, the driving state control unit 120 determines a shift to manual driving, prohibits autonomous driving for a predetermined period, and then ends the series of processes.

On the other hand, when it is determined in S102 that the readiness is at the acceptable level, the flow proceeds to S110. In S110, the presentation information adjustment unit 140 executes the hands-off possible notification. Thereafter, in S111, the driver state estimation unit 130 determines whether the driver has executed a hands-off motion.

Next, in S112, the driver state estimation unit 130 determines whether the readiness is at the acceptable level. When it is determined that the readiness is at the unacceptable level, the flow proceeds to S103. On the other hand, when it is determined in S112 that the readiness is at the acceptable level, in S113, the presentation information adjustment unit 140 executes the level 3 possible notification.

Next, in S114, it is determined whether the driving state control unit 120 has acquired a level 3 execution instruction. When it is determined that the level 3 execution instruction has not been acquired, the driving state control unit 120 waits until level 3 execution instruction is acquired. When it is determined that the level 3 execution instruction has been acquired, the flow proceeds to S115, and the driving state control unit 120 executes a shift to level 3. Thereafter, in S116, the presentation information adjustment unit 140 executes the second task possible notification. When S116 is executed, the series of processes is ended.

Next, a flow in a case of a switch from autonomous driving level 3 to autonomous driving level 2 will be described. First, in S201 in FIG. 11, the driving state control unit 120 determines whether a switch to autonomous driving level 2 at which hands-off is possible is imminent. When it is determined that a switch is imminent, in S202, the driving state control unit 120 determines whether the reason for the switch is elimination of traffic congestion or exit from the periphery monitoring unnecessary section (Lv3 area).

When it is determined in S202 that the reason for the switch is to eliminate traffic congestion, in S203 the presentation information adjustment unit 140 executes the driving change notification without the hands-on notification. In other words, in S203, the grip request to the driver to grip the steering wheel is stopped. After S203 is executed, the flow proceeds to S206.

On the other hand, when it is determined that the reason for the switch is to exit from the periphery monitoring unnecessary section, in S204, the presentation information adjustment unit 140 executes the driving change notification including the hands-on notification.

Thereafter, in S205, the driver state estimation unit 130 determines whether the driver has executed hands-on before a switch to autonomous driving level 2. When the driver has not executed hands-on before a switch, that is, when the hands-off state is maintained and a switch to autonomous driving level 2 is executed, the series of processes is ended without requesting hands-on again.

On the other hand, when it is determined in S204 that the hands-on has been executed before a switch to autonomous driving level 2, the flow proceeds to S206. In S206, the driver state estimation unit 130 determines whether the readiness is at the acceptable level. When it is determined that the readiness is at the acceptable level, in S207, the presentation information adjustment unit 140 executes the hands-off possible notification. After the process in S207 is executed, the flow proceeds to S211.

On the other hand, when it is determined in S206 that the readiness is not at the acceptable level, the driver state estimation unit 130 determines whether the readiness is at unacceptable level 1 in S208. When it is determined that the readiness is at unacceptable level 2, the flow proceeds to S209, the presentation information adjustment unit 140 executes the readiness failure notification, and the driving state control unit 120 executes a shift to manual driving, and then the series of processes is ended.

On the other hand, when it is determined at S207 that the readiness is at unacceptable level 1, in S210, the presentation information adjustment unit 140 the executes the readiness failure notification. After the process in S210 is executed, the flow proceeds to S211. In S211, the driver state estimation unit 130 determines whether the driver has executed a hands-off motion. When it is determined that the hands-off motion has not been executed, the flow returns to S206, and the readiness determination is repeatedly executed. On the other hand, when it is determined that the hands-off motion has been executed, the series of processes is ended.

Next, a flow regarding readiness estimation will be described with reference to FIG. 12. First, in S301, the driver state estimation unit 130 determines whether the autonomous driving level temporarily switches to manual driving during execution of autonomous driving level 2, and then returns to level 2. When an affirmative determination is made in S301, the flow proceeds to S302, and the driver state estimation unit 130 determines whether the previous state data of the driver at autonomous driving level 2 can be used for the current readiness estimation. When it is determined that the state data can be used, in S304 the driver state estimation unit 130 estimates the readiness using the previous state data, and then ends the series of processes.

On the other hand, when it is determined in S302 that the previous state data cannot be used for the current readiness estimation, the flow proceeds to S305, and the presentation information adjustment unit 140 executes the readiness measuring notification. In S306, the driver state estimation unit 130 executes readiness estimation using only the current state data, and then ends the series of processes.

S201 described above is an example of a "determination process", and S204 and S207 are an example of a "permit state control process".

According to the first embodiment described above, when a switch from autonomous driving level 3 to autonomous driving level 2 at which hands-off is permittable is executed, the driver is requested to grip the steering wheel, and hands-off at autonomous driving level 2 is permitted. Therefore, in a shift from autonomous driving level 3 to level 2, the driver is prompted to grip the steering wheel. As described above, it may be possible to provide information for prompting ensuring the stability of travel.

In the above embodiment, the driving state control unit 120 is an example of a "determination unit", and the driver state estimation unit 130 is an example of a "readiness determination unit". The presentation information adjustment unit 140 is an example of a "permit state control unit". Autonomous driving level 3 or higher is a "monitoring unnecessary state", and autonomous driving level 2 or lower is an example of a "monitoring necessary state". The readiness is an example of "readiness", and the periphery monitoring unnecessary section is an example of a "travel area where stoppage of periphery monitoring is permitted".

Second Embodiment

A modification example of the HCU 100 in the first embodiment will be described in a second embodiment. In the second embodiment, the presentation information adjustment unit 140 stops the hands-on notification when the reason for the switch from autonomous driving level 3 to level 2 is to exit from the periphery monitoring unnecessary section. In this case, in S202 of the flow in FIG. 11, the steps to which the flow proceeds are reversed when the presentation information adjustment unit 140 determines that the reason for the switch is elimination of traffic congestion and determines that the reason for the switch is to exit from the periphery monitoring unnecessary section.

Third Embodiment

A modification example of the HCU 100 in the first embodiment will be described in a third embodiment. When a switch to autonomous driving level 3 is permitted, the HCU 100 of the third embodiment switches to autonomous driving level 3 after requesting the driver to execute hands-on in the hands-off state of autonomous driving level 2.

In this case, when the level 3 possible information is acquired, the presentation information adjustment unit 140 executes the level 3 possible notification and the hands-on request notification. The driving state control unit 120 executes a switch to autonomous driving level 3 when the driver executes hands-on in this state and then an execution instruction for autonomous driving level 3 is acquired.

Figure 13:
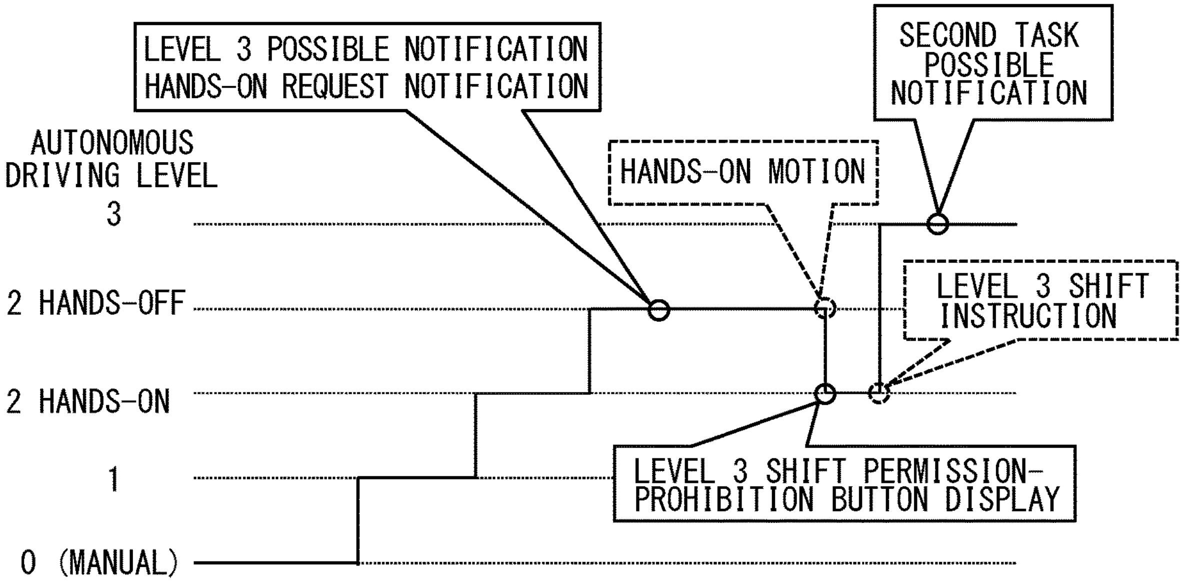
FIG. 13 is a time chart showing an example of a switch in an autonomous driving level.

A switch from autonomous driving level 2 to level 3 in the present embodiment will be described with reference to the time chart of FIG. 13. In the example in FIG. 13, it is assumed that the readiness is always at an acceptable level. In this case, before a switch to autonomous driving level 3, the hands-off possible notification is provided in the hands-on state of autonomous driving level 2. Thereafter, when the driver shifts to the hands-off state due to a motion of the driver, the level 3 possible notification and the hands-on request notification are executed. When the driver gives an instruction for a shift to level 3 after a shift to the hands-on state, the shift to autonomous driving level 3 is executed, and then the second task possible notification is executed.

Figure 14:
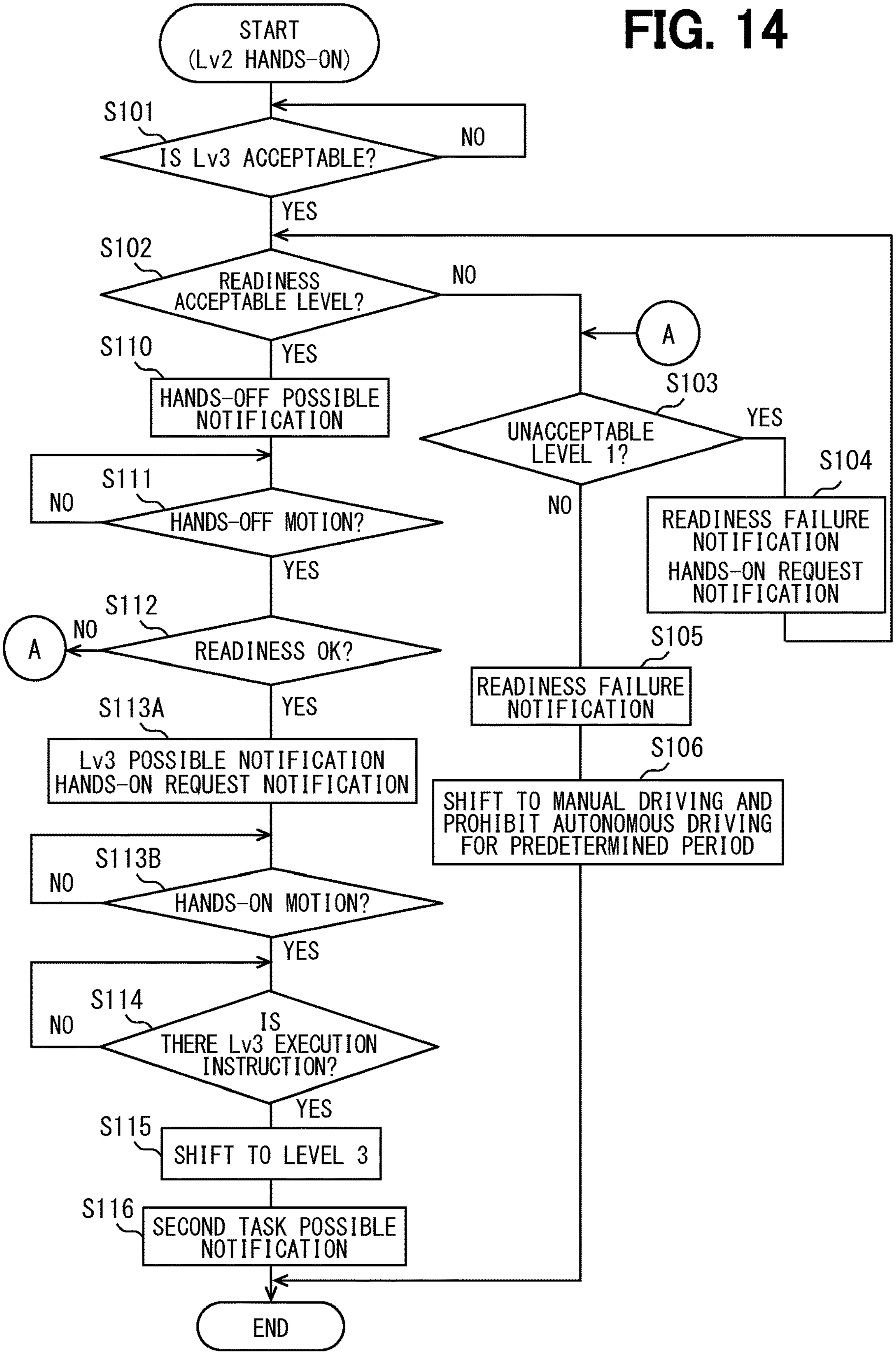
FIG. 14 is a flowchart showing an example of a presentation control method executed by an HCU in a third embodiment.

Next, a flow of the presentation control method executed by the HCU 100 will be described below with reference to FIG. 14. For S101 to S112 and S114 to S116 in FIG. 14, the description of the steps with the same reference numerals in FIG. 10 is used.

In S112, when the driver state estimation unit 130 determines that the readiness is at the acceptable level, the flow proceeds to S113A. In S113A, the presentation information adjustment unit 140 executes the level 3 possible notification and the hands-on request notification. Thereafter, in S113B, the driver state estimation unit 130 determines whether the driver has executed hands-on. When it is determined that the hands-on has been executed, the series of processes is ended after executing S114 to S116.

Fourth Embodiment

A modification example of the HCU 100 in the first embodiment will be described in a fourth embodiment. When a switch to autonomous driving level 3 or lower from autonomous driving level 4 is permitted, the HCU 100 of the fourth embodiment switches to autonomous driving level 3 after requesting the driver to execute hands-on from in the hands-off state of autonomous driving level 2.

In the fourth embodiment, when driving change is executed from autonomous driving level 4 to level 3 or lower, the driving state control unit 120 executes a shift to level 3 or lower after setting the level 2 hands-on state. The driving state control unit 120 determines whether securing conditions for securing that the driver has time to operate the steering wheel are established. The driving state control unit 120 changes a flow of a switch between autonomous driving levels when driving change is executed from a state in which the securing conditions at level 4 are established to level 3 or lower, and when driving change is executed from a state in which the securing conditions are not established at level 4 to level 3 or lower. A switch from autonomous driving level 4 to level 3, hands-off state level 2, level 1, or level 0 (manual driving) corresponds to "level decrease switch". A mode in which autonomous driving level 4 is executed is an example of a "level 4 mode", and a mode in which autonomous driving level 3 is executed is an example of a "level 3 mode". The shift in a driving state can also be rephrased below as a switch in a driving state.

For example, the securing conditions are established when the driver is sleeping within a predetermined time (for example, about 5 minutes) before the driving change. In other words, the driving state control unit 120 determines that the securing conditions are not established when the driver is in an awake state by a predetermined time before the driving change. The securing conditions may be that the vehicle continues to travel at autonomous driving level 4 for a predetermined period, or that the vehicle is traveling on a specific type of road (expressway or the like). It may be determined that the securing conditions are established when at least one of these individual conditions is established, or may be determined that the securing conditions are established only when two or more of these individual conditions are established. Exceptional conditions may also be set in the securing conditions, such as not being established when a periphery vehicle is within a predetermined range of the vehicle A, or not being established when the driver's stress exceeds a threshold.

Figure 15:
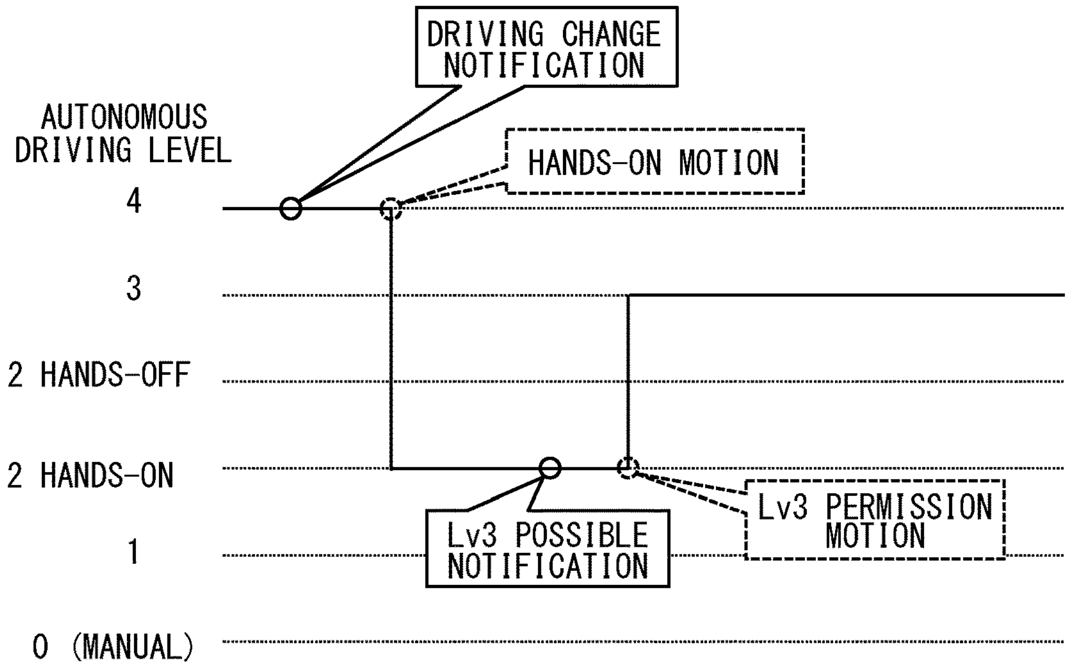
FIG. 15 is a time chart showing an example of a switch in an autonomous driving level.

In the following description, it is assumed that the securing conditions are established when sleeping is executed. The driving state control unit 120 determines a switch to level 3 or lower via the level 2 hands-on state when the driving change is executed from the sleeping state of level 4 to level 3 or lower (refer to FIG. 15).

Figure 16:
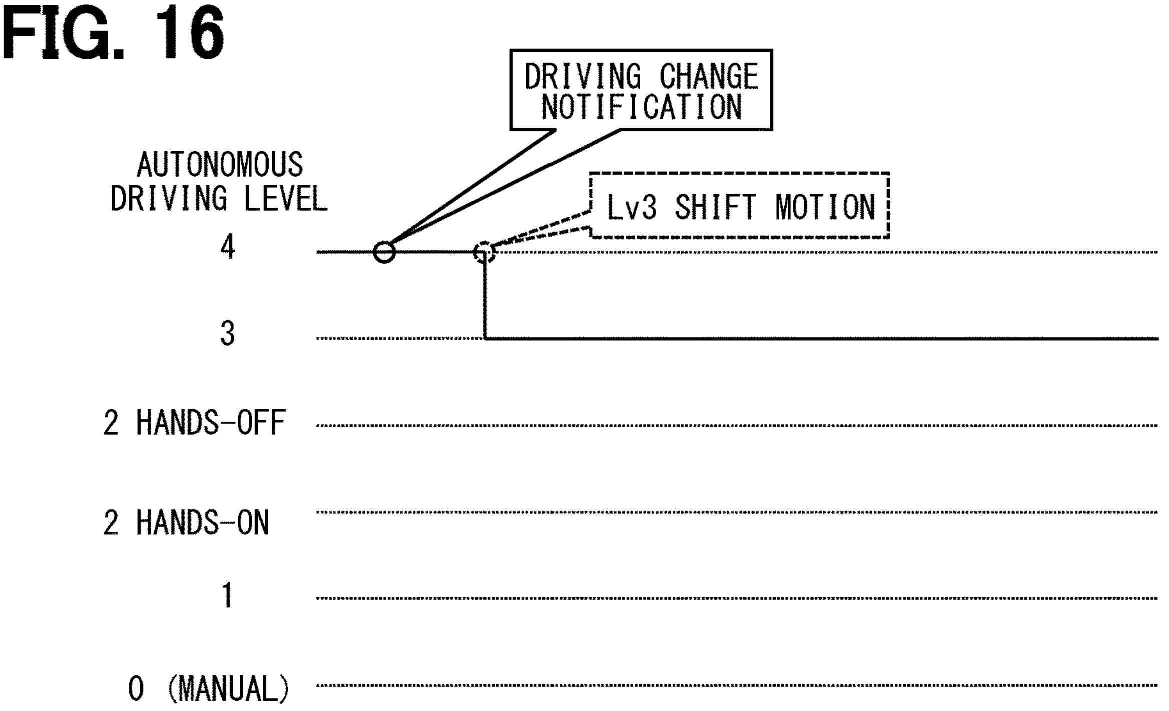
FIG. 16 is a time chart showing an example of a switch in an autonomous driving level.

On the other hand, the driving state control unit 120, when the driving change is executed to level 3 or lower without taking sleep at level 4, and a switch to level 3 or the level 2 hands-off is executed, executes a switch to a switch destination level without a switch to the level 2 hands-on state (refer to FIG. 16). In other words, the driving state control unit 120 executes stoppage determination of stopping a switch to the level 2 hands-on state.

Figure 17:
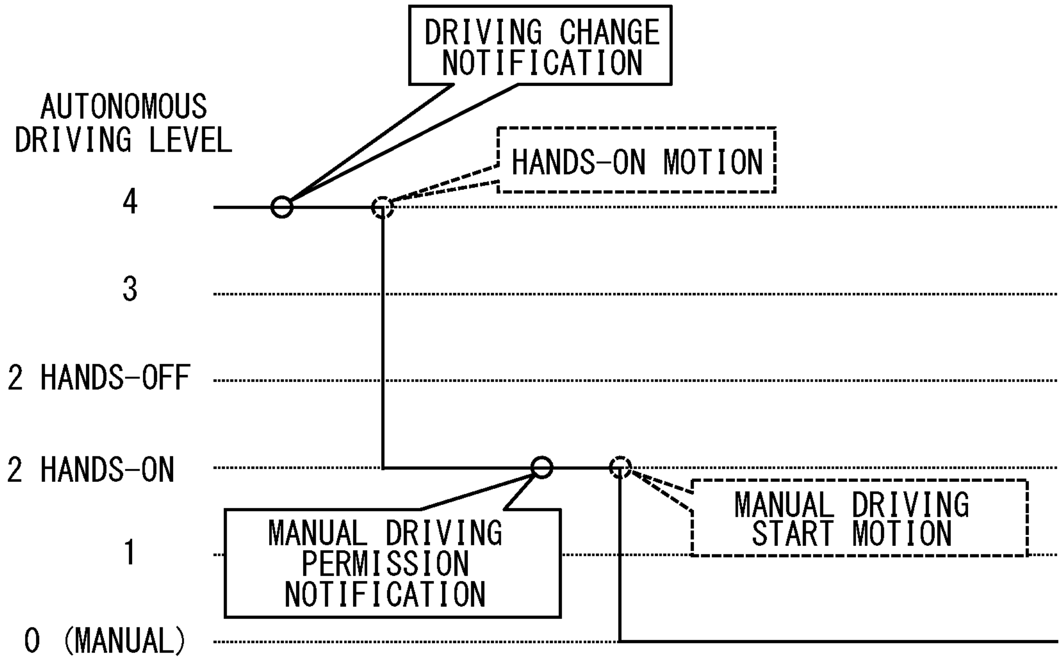
FIG. 17 is a time chart showing an example of a switch in an autonomous driving level.

The driving state control unit 120 executes a switch to a switch destination level via the level 2 hands-on state when the driving change is executed to level 3 or lower without sleeping at level 4 and a switch to level 1 or level 0 (manual driving) is executed (refer to FIG. 17).

Figure 18:
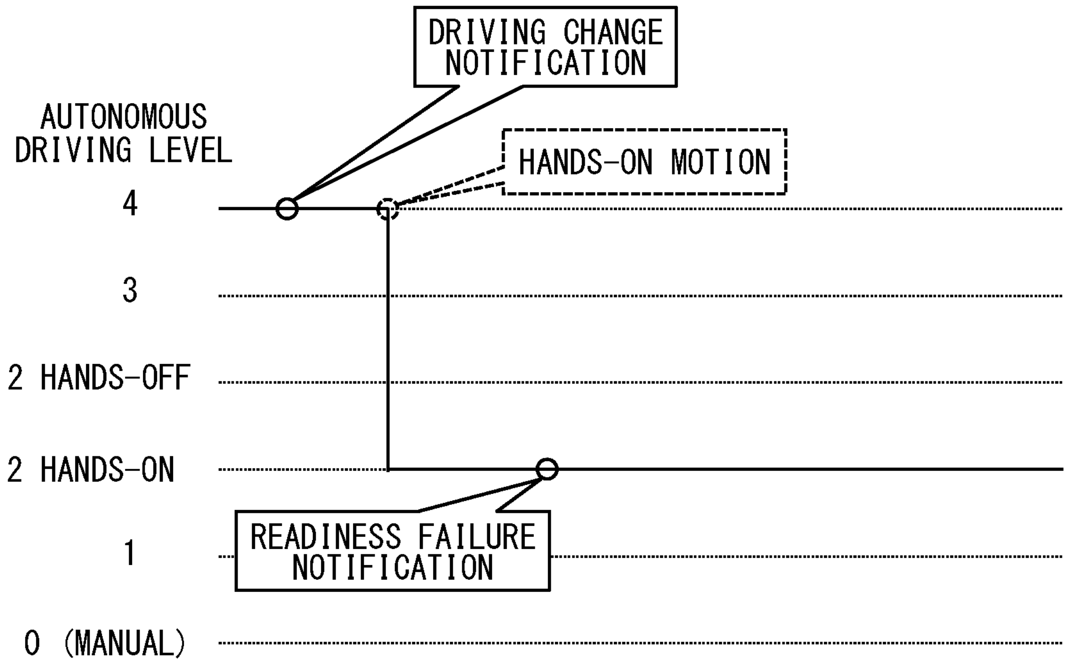
FIG. 18 is a time chart showing an example of a switch in an autonomous driving level.
Figure 19:
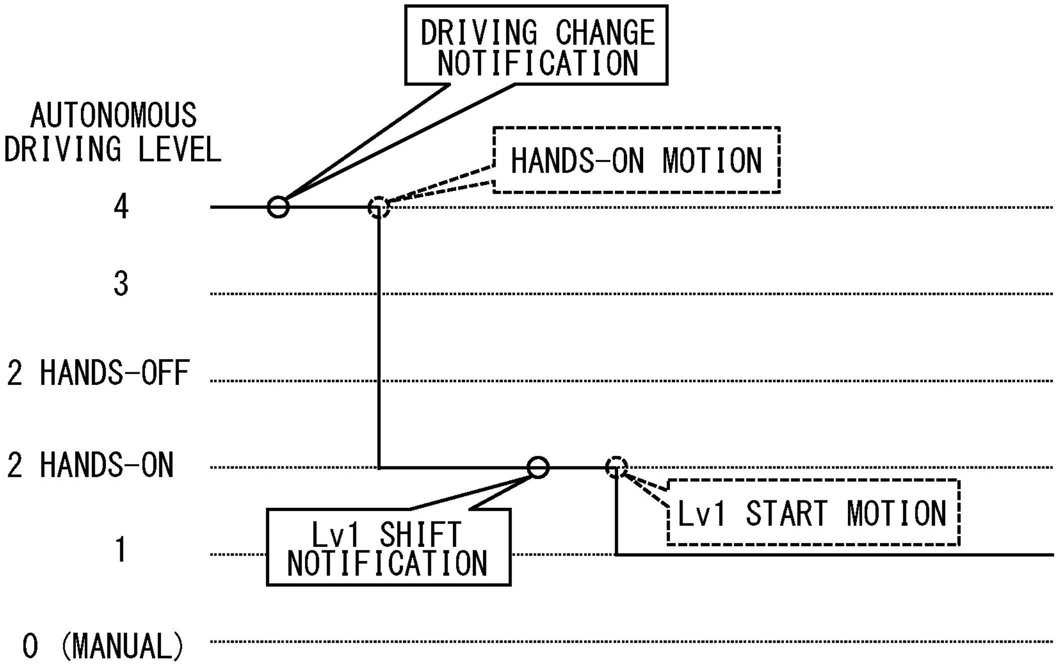
FIG. 19 is a time chart showing an example of a switch in an autonomous driving level.

However, when the driving state control unit 120 determines that the readiness is not at an acceptable level at level 2, level 2 is continued (refer to FIG. 18). When the driving state control unit 120 determines that there is no room for the MD area, the driving state control unit 120 executes a switch from autonomous driving level 2 to level 1 (FIG. 19).

The driving state control unit 120 changes the way of a switch to level 3 or lower depending on the reason why the driving change is necessary. Specifically, when the driving change is executed from level 4 to level 3 or lower due to external factors such as rain or fog, there is a high probability that the driver will need to execute an emergency operation, and thus the driving state control unit 120 executes a switch to level 2 or lower regardless of whether the vehicle is traveling in the AD area. On the other hand, in the case of driving change following the end of the AD area where level 4 is possible, the driver's emergency operation is unnecessary, and thus the driving state control unit 120 executes a switch to level 3.

The driver state estimation unit 130 changes a readiness acceptable level threshold when the driving change is executed to level 3 or lower from a sleeping state at level 4 and when the driving change is executed to level 3 or lower without sleeping at level 4. Specifically, the driver state estimation unit 130 sets a greater readiness determination threshold when the driving change is executed to level 3 or lower from a sleeping state at level 4 than when the driving change is executed to level 3 or lower without sleeping at level 4. That is, the readiness is determined more severely when the driving change is executed from a sleeping state at level 4 to level 3 or lower. For example, the driver state estimation unit 130 may change one or more conditions for determining readiness, such as a length of time required to determine that the readiness is OK, a threshold for distraction, a threshold for the degree of carelessness, and a threshold for the arousal level.

Figure 20:
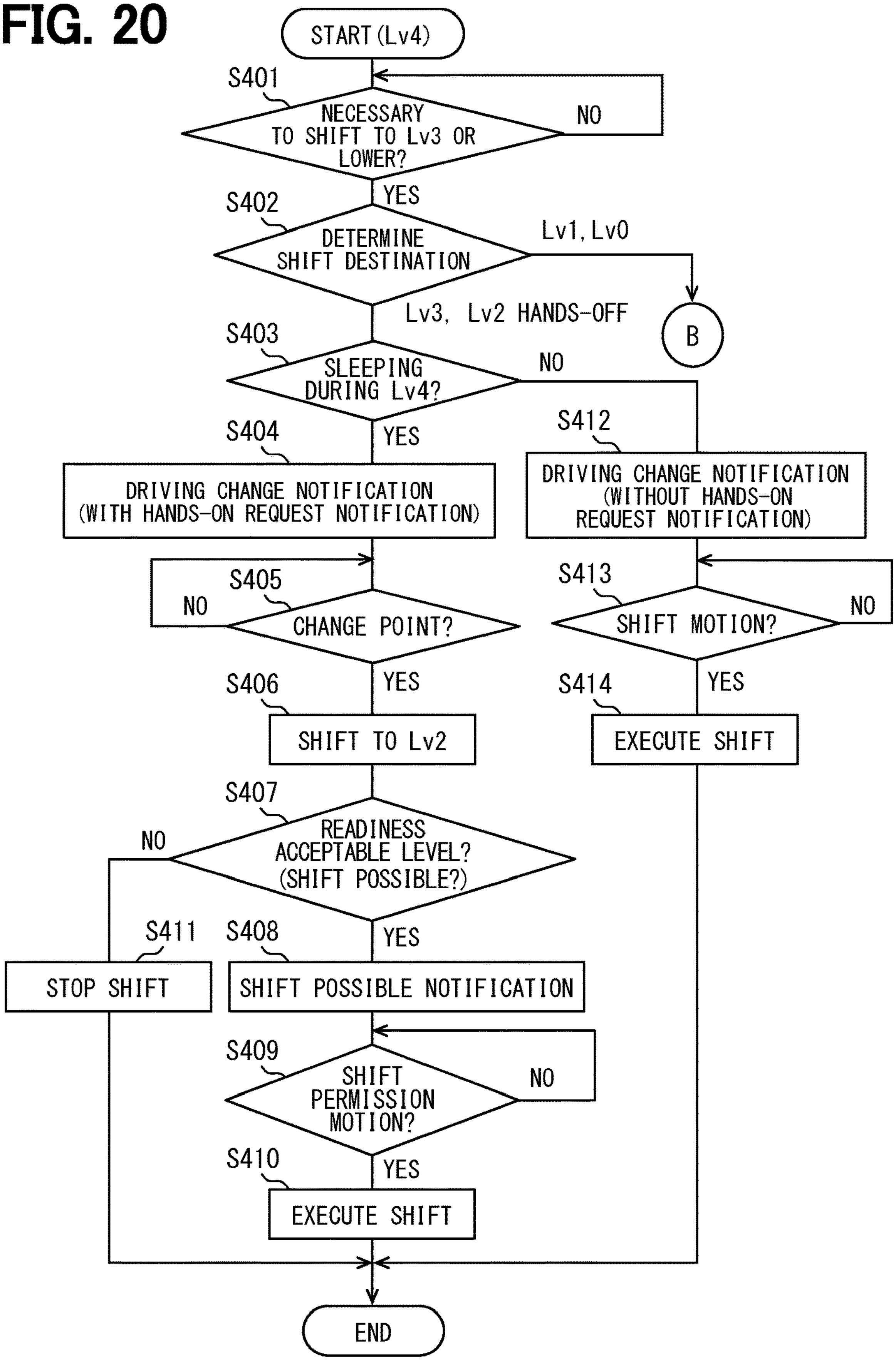
FIG. 20 is a flowchart showing an example of a presentation control method executed by an HCU in a fourth embodiment.

Next, a presentation control method executed by the HCU 100 in the fourth embodiment will be described with reference to flowcharts of FIGS. 20 and 21. It is assumed that the vehicle A is traveling at autonomous driving level 4 at the start of the flow in FIG. 20.

First, in S401, the driving state control unit 120 determines whether it is necessary to shift to autonomous driving level 3 or lower. In S402, the driving state control unit 120 determines a shift destination driving state. When it is determined to shift to autonomous driving level 3 and the hands-off state of level 2, the flow proceeds to S403.

In S403, it is determined whether the driver is sleeping during execution of autonomous driving level 4. When it is determined that the driver is sleeping, the flow proceeds to S404, and the presentation information adjustment unit 140 presents the driving change notification including the hands-on request notification.

In S405, the periphery state ascertaining unit 110 determines whether a change point has been passed. When it is determined that the change point has been passed, the driving state control unit 120 executes a switch to level 2 in S406. Next, in S407, the driver state estimation unit 130 determines whether the readiness is at an acceptable level, that is, whether a shift to autonomous driving level 3 can be executed.

When it is determined that the shift can be executed, the presentation information adjustment unit 140 presents a shift possible notification in S408. Thereafter, in S409, the driving state control unit 120 determines whether there is a shift permission motion. When it is determined that the shift permission motion has been executed, the driving state control unit 120 executes a shift in S410. When it is determined in S407 that the readiness is at an unacceptable level, the driving state control unit 120 stops the shift in S411. When it is determined in S407 that the readiness is at the unacceptable level, processing may be executed according to the degree of an unacceptable level, similarly to S208 to S210 of the first embodiment.

Figure 21:
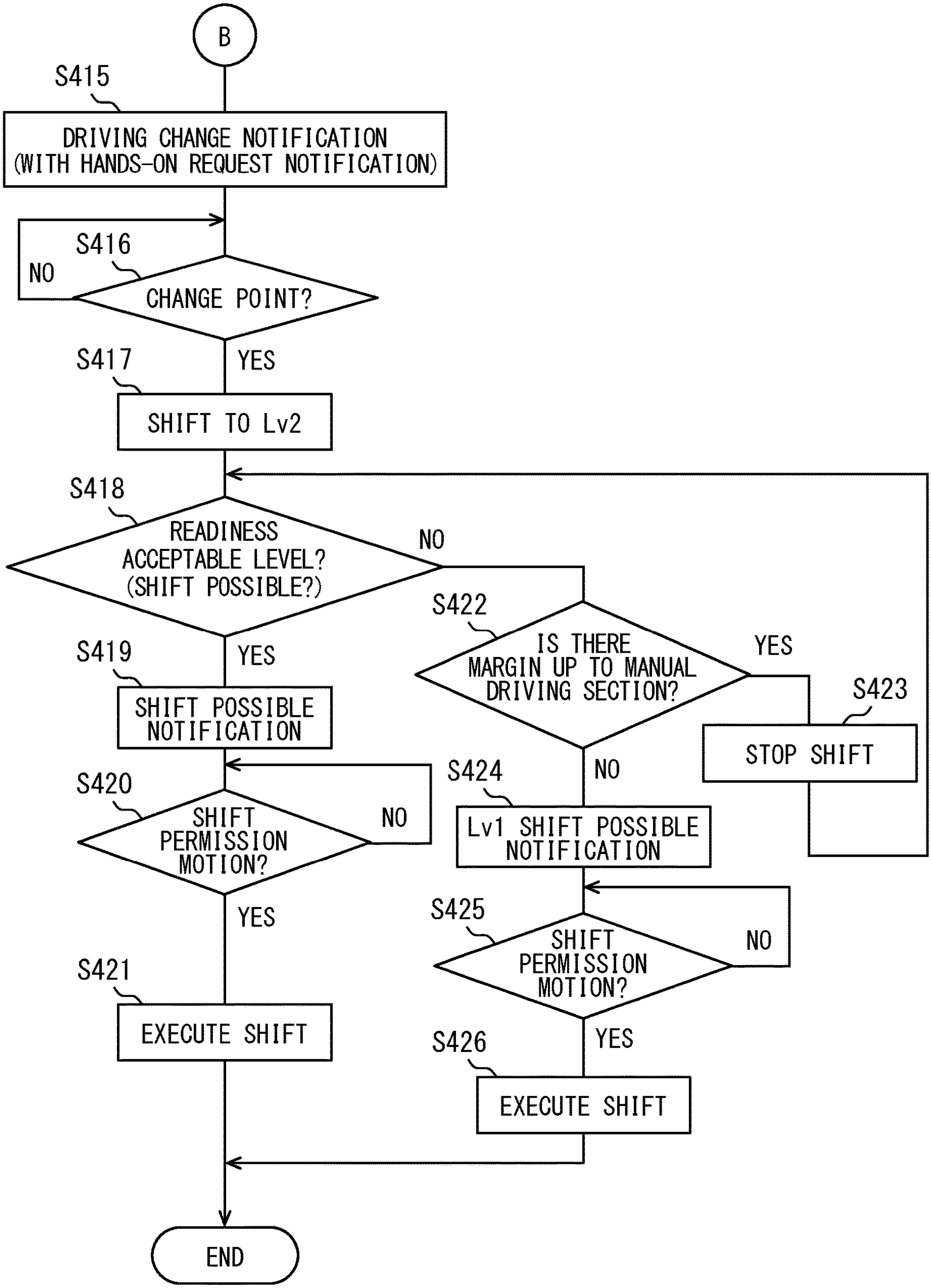
FIG. 21 is a flowchart showing a continuation of FIG. 20.

On the other hand, when it is determined in S402 that a shift to autonomous driving level 1 or lower is executed, the flow shifts to S415 in FIG. 21. The processes in S415, S416, and S417 are the same as the processes in S404, S405, and S406, respectively. In S418 following S417, the driver state estimation unit 130 determines whether the readiness is at an acceptable level, that is, whether a shift to autonomous driving level 1 or level 0 can be executed.

When it is determined that the readiness is at the acceptable level, in S419, presentation information adjustment unit 140 presents the shift possible notification. Thereafter, in S420, the driving state control unit 120 determines whether a shift permission motion has been executed. When it is determined that the shift permission motion has been executed, the driving state control unit 120 executes a shift in S421.

In S422, the driving state control unit 120 determines whether there is a margin up to the manual driving section. When it is determined that there is a margin, the driving state control unit 120 stops a shift in S423. After the process in S423, the flow returns to S418.

On the other hand, when it is determined in S422 that there is no margin, the flow proceeds to S424, and the presentation information adjustment unit 140 presents a level 1 shift possible notification. Thereafter, in S425, the driving state control unit 120 determines whether a shift permission motion has been executed. When it is determined that a shift permission motion has been executed, the driving state control unit 120 executes a shift to level 1 in S426.

Fifth Embodiment

A modification example of the autonomous driving control system 1 in the first embodiment will be described in a fifth embodiment.

In the fifth embodiment, when the driver state estimation unit 130 determines that the readiness has not reached the acceptable level, the autonomous driving control system 1 increases the prudence of control related to autonomous driving compared with when it is determined that the readiness is at the acceptable level. Increasing the prudence of control corresponds to executing control with lower risk in autonomous driving.

The control related to autonomous driving includes, for example, warning for lane departure, approach warning and deceleration control for peripheral objects such as other vehicles and pedestrians, and vehicle-to-vehicle distance adjustment. The warning for lane departure and the approach warning for peripheral objects may be executed by the presentation information adjustment unit 140. When the presentation information adjustment unit 140 determines that a distance from the lane line of the current lane is below a threshold, each display device and the audio device 24 may present a warning for lane departure. The presentation information adjustment unit 140 may cause each display device and the audio device 24 to present an approach warning when it is determined that a distance to a peripheral object is below the threshold.

When the driver state estimation unit 130 determines that the readiness has not reached the acceptable level, the presentation information adjustment unit 140 sets each of the above-described thresholds for presenting each warning to be lower than when it is determined that the readiness has reached the acceptable level.

The deceleration control and the vehicle-to-vehicle distance adjustment may be executed by the action planning unit 74 or the ACC control unit 64. For example, the action planning unit 74 may execute deceleration control when the environment recognition unit 73 determines that the distance to the peripheral object is below the threshold. The ACC control unit 64 may execute deceleration control when the environment recognition unit 63 determines that the distance to the peripheral object is below the threshold.

When the driver state estimation unit 130 determines that the readiness has not reached the acceptable level, the action planning unit 74 or the ACC control unit 64 sets the above-described threshold for executing deceleration control to be lower than when it is determined that the readiness has reached the acceptable level.

The action planning unit 74 or the ACC control unit 64 may adjust a vehicle-to-vehicle distance by executing acceleration and deceleration control such that a set vehicle-to-vehicle distance that is set in advance is maintained. When the driver state estimation unit 130 determines that the readiness has not reached the acceptable level, the action planning unit 74 or the ACC control unit 64 sets the set vehicle-to-vehicle distance to be shorter than when it is determined that the readiness has reached the acceptable level.

Figure 22:
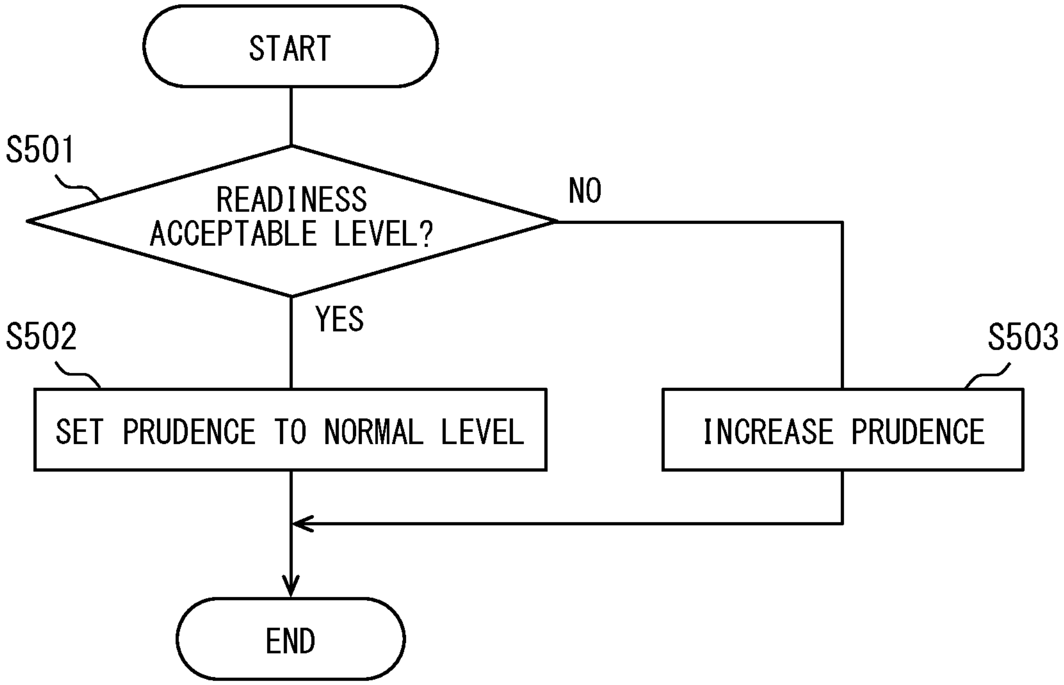
FIG. 22 is a flowchart showing an example of a control method executed by the control system in the fifth embodiment.

A process executed by the autonomous driving control system 1 in the fifth embodiment will be described with reference to FIG. 22. The process in FIG. 22 is repeatedly executed while autonomous driving control at autonomous driving level 1 or higher is being executed.

First, in S501, the driver state estimation unit 130 determines whether the driver's readiness has reached an acceptable level. When it is determined that the readiness has reached acceptable level has been reached, at least one of the presentation information adjustment unit 140, the action planning unit 74, and the ACC control unit 64 sets the prudence of control to a normal level in S502. On the other hand, when it is determined in S501 that the readiness has not reached the acceptable level, in S503, at least one of the action planning unit 74 and the ACC control unit 64 sets the prudence of control to be higher than the normal level.

Next, technical ideas that can be ascertained from the fifth embodiment will be added below.

(Appendix 1)

A control system that controls autonomous driving in a vehicle (A) capable of executing the autonomous driving, the control system including:

- a readiness determination unit (130) that determines whether a level of the driver's readiness for the autonomous driving has reached an acceptable level; and
- a control execution unit (64, 74, 140) that executes related control related to the autonomous driving, and sets a prudence of the related control to be higher when it is determined that the level of the readiness has reached the acceptable level than when it is determined that the level of the readiness has not reached the acceptable level.

(Appendix 2)

A presentation control program stored in a storage medium (101) to control autonomous driving in a vehicle (A) capable of executing the autonomous driving, the program causing a processor (102) to execute instructions including:

- a determination process (S501) of determining whether a level of the driver's readiness for the autonomous driving has reached an acceptable level; and
- a control execution process (S502, S503) of executing related control related to the autonomous driving, and setting a prudence of the related control to be higher when it is determined that the level of the readiness has reached the acceptable level than when it is determined that the level of the readiness has not reached the acceptable level.

In executing autonomous driving, a driver may not be sufficiently ready for autonomous driving. When the same autonomous driving control is executed when the readiness for autonomous driving is sufficient and when the readiness is not sufficient, the driver may feel uncomfortable with the autonomous driving control when the readiness is not sufficient.

According to the aspects of Appendix 1 and Appendix 2, when it is determined that the level of the driver's readiness for autonomous driving has reached the acceptable level, the prudence of the related control of the autonomous driving is set to be higher than when it is determined that the level of readiness has not reached the acceptable level. Therefore, the driver may be less likely to feel uncomfortable with the related control. Therefore, it is possible to provide a control system and a control program capable of reducing the driver's uncomfortable feeling with respect to autonomous driving control.

Sixth Embodiment

A modification example of the autonomous driving control system 1 in the first embodiment will be described in a sixth embodiment.

Figure 23:
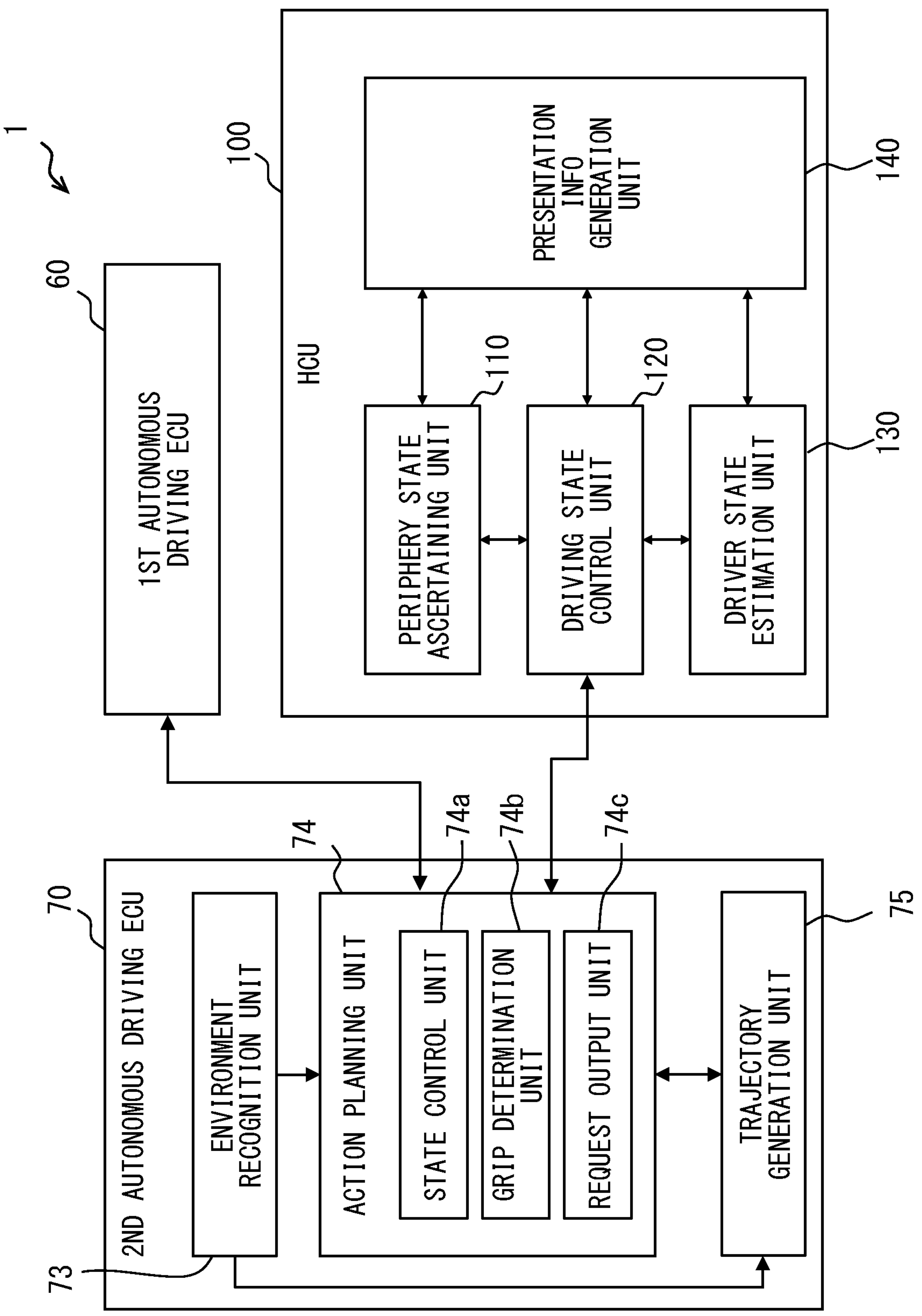
FIG. 23 is a block diagram showing an example of functions of an autonomous driving control system of a sixth embodiment.

In the autonomous driving control system 1 of the sixth embodiment shown in FIG. 23, a process of determining an autonomous driving level and whether hands-off is possible is executed mainly by the action planning unit 74 of the second autonomous driving ECU 70. The action planning unit 74 cooperates with the first autonomous driving ECU 60 and the driving state control unit 120 to cause a control state of autonomous driving to switch.

Based on the execution of the autonomous driving program stored in the memory 71 by the processor 72, the action planning unit 74 includes a state control unit 74*a*, a grip determination unit 74*b*, and a request output unit 74*c* as sub-function units related to a switch in the control state of autonomous driving.

The state control unit 74*a* executes a state control process (refer to S601 in FIG. 25) to execute a switch between autonomous driving level 3 or higher and autonomous driving level 2 or lower. For example, when the vehicle A moves from the periphery monitoring unnecessary section to the periphery monitoring necessary section, or when the vehicle A deviates from a traffic congestion vehicle line, the state control unit 74*a* determines a switch from autonomous driving level 3 to level 2. On the other hand, when the vehicle A moves from the periphery monitoring necessary section to the periphery monitoring unnecessary section, or when the vehicle A joins a traffic congestion vehicle line, the state control unit 74*a* determines a switch from autonomous driving level 2 to level 3.

The grip determination unit 74*b* executes a grip determination process (refer to S602 in FIG. 25) to determine whether to permit the driver to stop gripping the steering wheel in the monitoring necessary state of autonomous driving level 2. When a switch to autonomous driving level 2 is determined by the state control unit 74*a*, the grip determination unit 74*b* determines whether hands-off can be permitted after the switch to autonomous driving level 2 before the switch to autonomous driving level 2.

When the grip determination unit 74*b* determines that the hands-off can be permitted, the grip determination unit 74*b* ascertains the reason for the switch from autonomous driving level 3 to the level 2. The reason for the switch to autonomous driving level 2 is, in other words, the reason for canceling autonomous driving level 3. As reasons for the switch to autonomous driving level 2, exit from the periphery monitoring unnecessary section, elimination of traffic congestion, establishment of stoppage conditions during traveling in traffic congestion, and the like are assumed in advance. The grip determination unit 74*b* sets a switch pattern from autonomous driving level 3 to the hands-off state of autonomous driving level 2 based on the ascertained reason for the switch.

When the reason for the switch is to exit from the periphery monitoring unnecessary section or elimination of traffic congestion, the grip determination unit 74*b* sets the hands-on state of autonomous driving level 2 during the switch from autonomous driving level 3 to the hands-off state of autonomous driving level 2. In this switch pattern, the shift from autonomous driving level 3 to the hands-on state of autonomous driving level 2 is executed, and then a shift from the hands-on state to the hands-off state is further executed.

On the other hand, when the reason for the switch is the establishment of stoppage conditions during traveling in traffic congestion, or the like, the switch from autonomous driving level 3 to autonomous driving level 2 hands-on state is executed step by step. In this switch pattern, the shift from autonomous driving level 3 to the hands-off state of autonomous driving level 2 is executed, and then a shift from the hands-off state to the hands-on state is further executed.

The grip determination unit 74*b* executes a gradual switch to the hands-on state even in scenes other than the scene in which the stoppage conditions during traveling in traffic congestion are established. For example, when the continuation period of autonomous driving level 3 is shorter than a predetermined time, the grip determination unit 74*b* executes a switch from autonomous driving level 3 to the hands-off of level 2. Even when there is a future prediction that autonomous driving level 3 will return to autonomous driving level 3, such as ascertaining that traffic congestion will occur again after autonomous driving level 3 is canceled, the grip determination unit 74*b* executes a switch from autonomous driving level 3 to the hands-off of level 2.

The request output unit 74*c* executes the request output process (refer to S604, S608, and the like in FIG. 25) to output various types of notification execution requests to the driving state control unit 120 such that the presentation information adjustment unit 140 can execute notifications synchronized with a state switch of autonomous driving. The request output unit 74*c* cooperates with the driving state control unit 120 to cause the presentation information adjustment unit 140 to execute the same hands-off possible notification, level 3 possible notification, second task possible notification, driving change notification, hands-on request notification, manual driving shift notification, and the like as in the first embodiment. For example, the request output unit 74*c* outputs, to the driving state control unit 120, a notification execution request (grip request) for requesting the driver to grip the steering wheel. The request output unit 74*c* outputs a notification execution request for requesting execution of the hands-off possible notification when the switch from the hands-on state to the hands-off state is executed.

Next, the details of specific driving change scenes 1 to 3 in which a switch from autonomous driving level 3 to autonomous driving level 2 is executed will be described below. The driving change scenes 1 to 3 have different reasons for a switch to autonomous driving level 2.

(Driving Change Scene 1: Exit from Periphery Monitoring Unnecessary Section or the Like)

The driving change scene 1 (refer to FIG. 5) is a driving change scene in which the vehicle A is scheduled to exit from the periphery monitoring unnecessary section (or the AD area). In the driving change scene 1, the hands-on state is temporarily set during the switch to the hands-off state. That is, when the switch from autonomous driving level 3 to the hands-off state of level 2 is executed, this hands-off state is not temporarily permitted.

Specifically, when the state control unit 74*a* determines a switch to autonomous driving level 2, a notification execution request for requesting execution of the driving change notification is output from the request output unit 74*c* to the driving state control unit 120. In the driving change scene 1, the request output unit 74*c* causes the HCU 100 to execute the driving change notification including the hands-on request notification (refer to S604 in FIG. 25). Even when the driver does not execute a hands-on motion after the hands-on request notification is presented, the switch to autonomous driving level 2 is executed.

After the driving change notification is executed, the state control unit 74*a* and the grip determination unit 74*b* cause the control state to shift from autonomous driving level 3 to the hands-on state of level 2. The setting of the hands-on state is intended to give the driver a sense of driving. Therefore, the duration of the hands-on state is changed according to the duration of autonomous driving level 3. That is, as the continuation period of autonomous driving level 3 expires, the grip determination unit 74*b* sets the duration of the hands-on state to be longer continuously or stepwise.

The grip determination unit 74*b* permits the driver to stop gripping the steering wheel after the hands-on state is continued for a specific time. Consequently, the request output unit 74*c* outputs a notification execution request for requesting execution of the hands-off possible notification to the driving state control unit 120. When the driver who has recognized the hands-on request notification is executing a hands-on motion, the presentation information adjustment unit 140 executes the hands-off possible notification based on the acquisition of the notification execution request by the driving state control unit 120. When the driver who has received the hands-off possible notification executes a hands-off motion, the switch to the hands-off state of autonomous driving level 2 is executed.

(Driving Change Scene 2: Elimination of Traffic Congestion)

The driving change scene 2 (refer to FIG. 5) is a driving change scene in which traffic congestion around the subject vehicle is scheduled to be eliminated in the AD area. In the driving change scene 2, similarly to the driving change scene 1, the hands-on state is temporarily set during a switch to the hands-off state. That is, the grip determination unit 74*b* causes the autonomous driving control to shift to the hands-on state of level 2 after the driving change notification is executed. The grip determination unit 74*b* causes the autonomous driving control to shift to the hands-off state of level 2 after the hands-on possible notification is executed.

Figure 25:
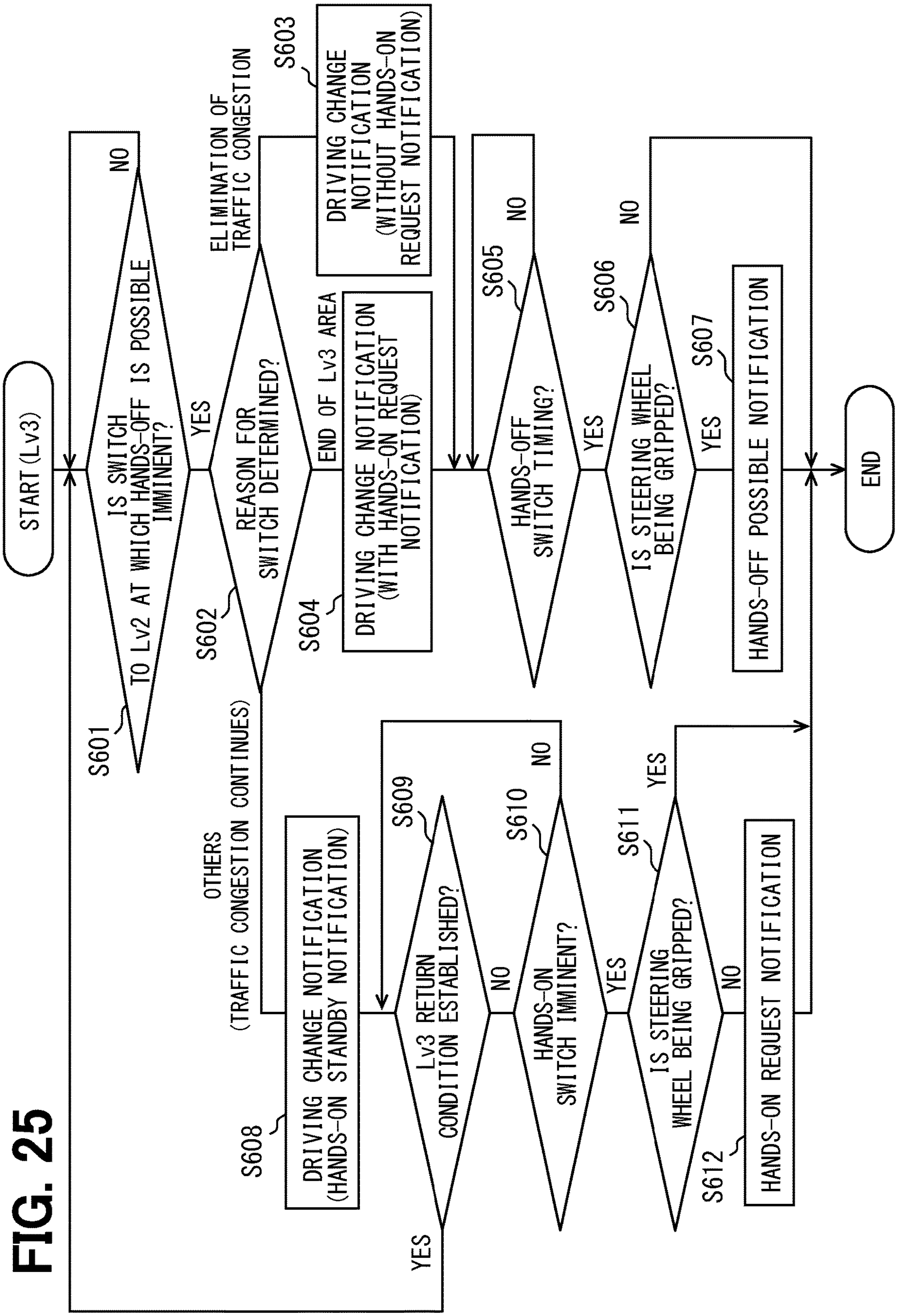
FIG. 25 is a flowchart showing an example of a control method executed by the autonomous driving control system in the sixth and seventh embodiments.

On the other hand, unlike the driving change scene 1 described above, the driving change notification executed in the driving change scene 2 does not include the hands-on request notification (refer to S603 in FIG. 25). That is, when the reason for the switch is elimination of the traffic congestion, the request to the driver to grip the steering wheel is stopped. The hands-on request notification may also be executed in the driving change notification in the driving change scene 2 based on settings made by the driver.

(Driving Change Scene 3: Establishment of Stoppage Conditions During Traveling in Traffic Congestion)

The driving change scene 3 (refer to FIG. 24) is a scene in which the driving change is required even though the traffic congestion continues in the AD area. During the execution of autonomous driving level 3 for traveling in traffic congestion, for example, when there is no rear vehicle traveling in the same lane as the subject vehicle, or when the periphery monitoring sensor 40 does not detect a rear vehicle, the state control unit 74*a* establishes the stoppage conditions for level 3 during the traffic congestion. In this case, as described above, a switch from autonomous driving level 3 (hereinafter referred to as traffic congestion level 3) at which the vehicle is traveling in traffic congestion to the hands-on state of autonomous driving level 2 is executed step by step.

Specifically, when the state control unit 74*a* determines a switch to autonomous driving level 2, also in the driving change scene 3, the notification execution request for requesting execution of the driving change notification is output from the request output unit 74*c* to the driving state control unit. 120. In the driving change scene 3, the request output unit 74*c* causes the HCU 100 to execute a driving change notification including a hands-on standby notification (refer to S608 in FIG. 25).

The hands-on standby notification is a notification that is executed when a direct (continuous) switch from autonomous driving level 3 to the hands-off state of autonomous driving level 2 is executed, and is a notification for requesting the driver to be ready to grip the steering wheel.

Specifically, in hands-on standby notification in (Pattern 1), the driver is requested to change positions of the arms in anticipation of a shift to the hands-on state through a notification for prompting the driver to temporarily grip the steering wheel, a notification for prompting the driver to place the arm on the elbow rest, or the like. In this case, a notification execution request for executing an arm position changing motion request is output from the request output unit 74*c* to the driving state control unit 120.

In the hands-on standby notification in (Pattern 2), a notification for requesting the driver to monitor the periphery and a notification for requesting the driver to take an ideal posture under the state of stoppage of steering wheel grip (under the hands-off state) are executed on the driver. In this case, a notification execution request for executing the monitoring request and the posture request is output from the request output unit 74*c* to the driving state control unit 120.

After executing the driving change notification including the hands-on standby notification, the state control unit 74*a* and the grip determination unit 74*b* cause the control state to shift from autonomous driving level 3 to the hands-off state of level 2. Even when the driver does not execute an eyes-on motion after the hands-on standby notification is presented, a switch to autonomous driving level 2 is executed.

After the shift to the hands-off state of autonomous driving level 2, when this hands-off state continues for a predetermined time or more, a grip request (hands-on request notification) may be executed even when a state in which stoppage of gripping of the steering wheel is permittable continues. The hands-on request notification in this case is also a notification so that the driver does not lose his sense of driving operation. The predetermined time may start to be measured from the start time of autonomous driving level 3, or may start to be measured from the end time of autonomous driving level 3. As an example, when the elapsed time from the start time of autonomous driving level 3 exceeds 1 hour, even when hands-off continuation enable conditions are established, control of a shift to the hands-on state and a shift notification are executed.

When conditions for requiring a shift to the hands-on state occur after the shift to the hands-off state of autonomous driving level 2, the grip determination unit 74*b* determines a switch from the hands-off state to the hands-on state. As an example, the grip determination unit 74*b* determines a switch to the hands-on state when a road environment during traveling deteriorates, such as blurring of lane markings on the subject vehicle side. In this case as well, the request output unit 74*c* and the HCU 100 cooperate to execute the hands-on request notification. A switch from the hands-off state to the hands-on state is executed when the driver who has recognized the hands-on request notification executes a hands-on motion.

In the driving change scene 3, when conditions for returning to autonomous driving level 3 are established (the stoppage conditions are canceled) after the shift to the hands-off state of autonomous driving level 2 (refer to S610 in FIG. 25), the state control unit 74*a* executes a shift from autonomous driving level 2 to autonomous driving level 3. For example, when the detection of a rear vehicle is resumed, the state control unit 74*a* determines that the stoppage conditions are canceled, and determines a switch to autonomous driving level 3 (refer to one-dot chain line in FIG. 24). In this case, the notification execution request for the level 3 possible notification is output from the request output unit 74*c* to the driving state control unit 120.

Figure 24:
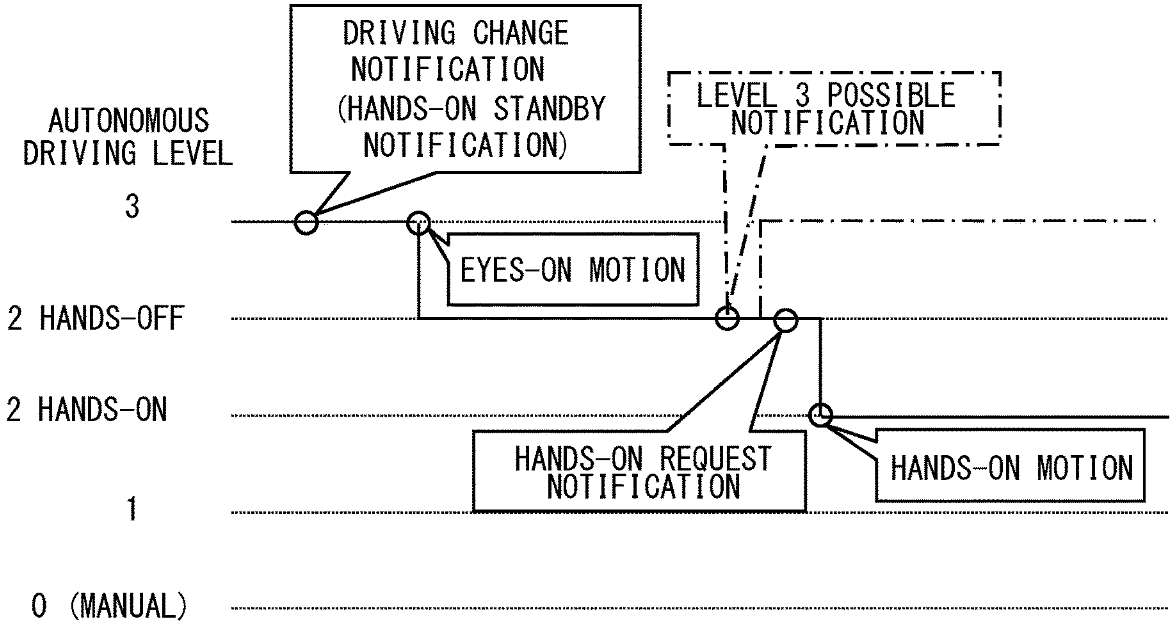
FIG. 24 is a time chart showing an example of a switch in an autonomous driving level.

Next, the details of a control flow for realizing a switch from autonomous driving level 3 to autonomous driving level 2 through cooperation between the functional blocks of the second autonomous driving ECU 70 and the HCU 100 will now be described with reference to FIG. 25 together with FIGS. 1 and 24.

In S601, the state control unit 74*a* determines whether a switch to autonomous driving level 2 in which hands-off is possible is imminent. When it is determined that the switch is imminent in S601, the grip determination unit 74*b* determines the reason for the switch to autonomous driving level 2 in S602. The processing contents of S601 and S602 described above are substantially the same as the processing contents of S201 and S202 (refer to FIG. 11) of the first embodiment.

When it is determined in S602 that the reason for the switch is to exit from the periphery monitoring unnecessary section (the end of the level 3 area and the driving change scene 1), in S604, the request output unit 74*c* cooperates with the HCU 100 to execute the driving change notification including the hands-on request notification. When it is determined in S602 that the reason for the switch is elimination of the traffic congestion (driving change scene 2), in S603, the request output unit 74*c* cooperates with the HCU 100 to execute the driving change notification that does not include the hands-on request notification. In S603, the request to the driver to grip the steering wheel is stopped.

After the execution of the driving change notification in S603 and S604, a switch from autonomous driving level 3 to the hands-on state of level 2 is executed (refer to FIG. 5). When the grip determination unit 74*b* determines in S605 that a switch timing to the hands-off state has arrived, in S606, the presentation information adjustment unit 140 ascertains whether the driver is gripping the steering wheel. When gripping of the steering wheel is ascertained in S606, in S607, the presentation information adjustment unit 140 executes the hands-off possible notification based on the notification execution request input from the request output unit 74*c*. On the other hand, when the driver does not grip the steering wheel, the hands-off possible notification is omitted. A switch from the hands-on state to the hands-off state is executed by the grip determination unit 74*b*.

When it is determined in S602 that the reason for the switch is a reason (driving change scene 3) other than the end of the level 3 area and the elimination of the traffic congestion, the action planning unit 74 executes a shift from autonomous driving level 3 to the hands-off state and then further executes a shift to the eyes-on state. In this case, in S608, the request output unit 74*c* cooperates with the HCU 100 to execute the driving change notification including the hands-on standby notification. A switch from autonomous driving level 3 to the hands-off state of level 2 is executed (refer to FIG. 24).

In S609, the state control unit 74*a* determines whether conditions for returning to autonomous driving level 3 (traffic congestion level 3) are established. In S609, when it is determined that the return conditions are established, the state control unit 74*a* determines a switch from the eyes-off state to autonomous driving level 3. On the other hand, when it is determined in S609 that the return conditions are not established, in S610, the grip determination unit 74*b* determines whether a switch to the hands-on state is imminent. When the hands-off state continues, the determination of whether the return conditions are established in S609 is repeatedly executed.

On the other hand, when it is determined in S610 that the switch is imminent, in S611, the presentation information adjustment unit 140 ascertains whether the driver is gripping the steering wheel. When the driver does not grip the steering wheel, in S612, the presentation information adjustment unit 140 executes a hands-on request notification based on the notification execution request input from the request output unit 74*c*. On the other hand, when gripping of the steering wheel is ascertained, the hands-on request notification is omitted. A switch from the hands-off state to the hands-on state is executed by the grip determination unit 74*b*.

Figure 26:
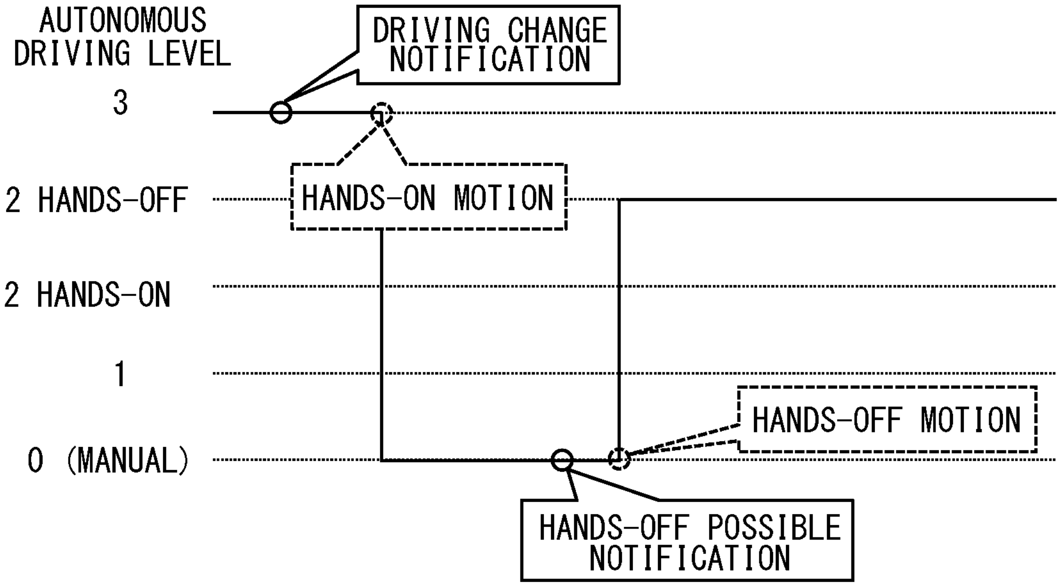
FIG. 26 is a time chart showing an example of a switch in an autonomous driving level.

Next, details of a scene (refer to FIG. 26) in which a switch from autonomous driving level 3 to autonomous driving level 1 or manual driving is executed without a switch to autonomous driving level 2 will be described. As an example, when an object to be avoided occurs in front of the vehicle A, the action planning unit 74 cancels autonomous driving level 3 and executes the driving change to the driver.

The action planning unit 74 can execute a state return process of directly shifting from manual driving to the hands-off state of level 2. Specifically, when it is determined that hands-off can be permitted within a predetermined time (for example, about ten seconds to several tens of seconds) after executing a switch from autonomous driving level 3 to manual driving, the action planning unit 74 omits the progress of increasing the autonomous driving level in stepwise manner. Specifically, in the state return process, the action planning unit 74 omits a shift to the autonomous driving level 1 and the hands-on state of autonomous driving level 2, and determines to start autonomous driving level 2 in the hands-off state. In this case as well, the request output unit 74*c* and the driving state control unit 120 cooperate and execute a switch from manual driving to the hands-off state after the presentation information adjustment unit 140 executes the hands-off possible notification.

The action planning unit 74 can skip at least one switch stage due to the state return process. As an example, the action planning unit 74 may omit the switch to autonomous driving level 1 after shifting from autonomous driving level 3 to manual driving. In this case, after a shift from manual driving to the hands-on state of autonomous driving level 2, a shift to the hands-off state is further executed. As another example, even when autonomous driving level 3 is directly switched to level 1, the action planning unit 74 may omit a switch to the hands-on state of autonomous driving level 2, and execute a direct shift from autonomous driving level 1 to the hands-off state of level 2.

According to the sixth embodiment described above, when a switch from autonomous driving level 3 to autonomous driving level 2 at which hands-off can be permitted, a request to the driver to grip the steering wheel is executed, and hands-off of autonomous driving level 2 is permitted. Therefore, in a shift from autonomous driving level 3 to level 2, the driver is prompted to grip the steering wheel. As described above, it may be possible to provide information for prompting ensuring the stability of travel.

In the sixth embodiment, the hands-off state of autonomous driving level 2 is permitted after the grip request is output by the request output unit 74*c*. Therefore, after the driver grips the steering wheel, a shift to the hands-off state is more likely to be executed. As a result, the driver can once regain his-her sense of driving at the end of autonomous driving level 3.

In the sixth embodiment, when the reason for the switch to autonomous driving level 2 is elimination of the traffic congestion, the action planning unit 74 executes a temporary shift from autonomous driving level 3 to the hands-on state of the level 2, and then executes a shift from the hands-on state to the hands-off state. As described above, a shift to the hands-off state can also be executed after the driver grips the steering wheel. As a result, the driver can once regain his-her sense of driving at the end of autonomous driving level 3.

In the sixth embodiment, the reason for the switch to autonomous driving level 2 is a reason different from the elimination of the traffic congestion, and when the traffic congestion continues, after a switch from autonomous driving level 3 to the eyes-off state of level 2, the grip request to the driver is executed. As described above, when the traffic congestion continues, a traveling speed of the subject vehicle also decreases, and thus the driver can easily regain his sense of driving. Therefore, even when a switch to the hands-on state is omitted and the driver's annoyance is reduced, it is possible to ensure the stability of travel.

In the sixth embodiment, when the reason for the switch is the disappearance of a rear vehicle, the grip request to the driver is executed after a switch from autonomous driving level 3 to the eyes-off state of level 2. When the vehicle is traveling in traffic congestion, even when a rear vehicle is not detected temporarily, the detection of a rear vehicle is resumed, and the possibility of resuming autonomous driving level 3 increases. Therefore, by omitting the grip request associated with a shift to the eyes-off state, it is possible to effectively reduce annoying notifications for the driver.

In the sixth embodiment, when the hands-off state continues for a predetermined time or more, the grip request to the driver is executed even when the hands-off state can be continuously permitted. According to the above description, it is possible to appropriately stop the continuation of the state in which the steering wheel is not gripped, so that the driver does not lose his sense of driving operation.

In the sixth embodiment, when a direct switch from autonomous driving level 3 to the hands-off state is executed, the hands-on standby notification for requesting the driver to change arm positions is executed. With a shift to the hands-off state, it is difficult for the driver to realize that the driving change is executed simply by causing the driver to start monitoring the periphery. Therefore, by requesting a change of the arm position, it becomes possible for the driver to realize that the right to control the driving operation has been taken over.

In the sixth embodiment, the hands-on standby notification is executed when a direct switch from autonomous driving level 3 to the hands-off state is executed. This hands-on standby notification includes a monitoring request for requesting the driver to monitor the periphery and a posture request for requesting the driver to take an ideal posture in the hands-off state. As described above, it is possible to make the driver realize that the right to control the driving operation has been taken over not only by monitoring the periphery but also by requesting the posture.

In the sixth embodiment, when autonomous driving in the hands-off state becomes possible after a switch from autonomous driving level 3 to the manual driving state, switches to autonomous driving level 1 and the hands-on state are omitted. According to the above description, a shift from manual driving to the hands-off state of autonomous driving level 2 can be executed quickly. As a result, a user's convenience of autonomous driving can be improved.

In the sixth embodiment, when a switch from autonomous driving level 3 to level 2 is executed during traffic congestion, a shift to the hands-off state of autonomous driving level 2 is executed and then a shift to the hands-on state is executed According to the above description, since the hands-off state is temporarily provided, when a switch from autonomous driving level 3 to level 2 is stopped, returning to autonomous driving level 3 can be executed before prompting the driver to grip the steering wheel. As a result, it may be possible to prompt to ensure the stability of travel while ensuring convenience for the driver.

In the sixth embodiment, when it is determined that the hands-off state can be permitted within a predetermined time after a switch from autonomous driving level 3 to level 2 is executed, a shift to the hands-on state of autonomous driving level 2 is omitted. According to the above description, since a direct shift from manual driving to the hands-off state of autonomous driving level 2 is executed, the driver can end gripping the steering wheel early. As a result, it may be possible to prompt to ensure the stability of travel while ensuring convenience for the driver.

Next, technical ideas that can be ascertained from the sixth embodiment will be added below.

(Appendix 3)

An autonomous driving control device capable of executing autonomous driving in a vehicle (A), including:

a state control unit (74*a*) that executes a switch between a monitoring unnecessary state in which stoppage of periphery monitoring by a driver during execution of the autonomous driving is permitted and a monitoring necessary state in which the stoppage of the periphery monitoring by the driver during execution of the autonomous driving is prohibited; and a grip determination unit (74*b*) that determines whether stoppage of gripping of a steering wheel by the driver is permitted in the monitoring necessary state, wherein the grip determination unit does not temporarily permit the stoppage of steering wheel grip when a switch from the monitoring unnecessary state to the monitoring necessary state in which the stoppage of steering wheel grip can be permitted is executed.

(Appendix 4)

An autonomous driving control program stored in a storage medium (71) to enable autonomous driving in a vehicle (A), the program causing a processor (72) to execute instructions including:

a state control process (S601) of executing a switch between a monitoring unnecessary state in which stoppage of periphery monitoring by a driver during execution of the autonomous driving is permitted and a monitoring necessary state in which the stoppage of the periphery monitoring by the driver during execution of the autonomous driving is prohibited; and a grip determination process (S602, S604, S607) of determining whether stoppage of gripping of a steering wheel by the driver is permittable in the monitoring necessary state, wherein, in the grip determination process, the stoppage of steering wheel grip is not temporarily permitted when a switch from the monitoring unnecessary state to the monitoring necessary state in which the stoppage of steering wheel grip can be permitted is executed.

Also in the aspects of Appendix 3 and Appendix 4, the driver is prompted to grip the steering wheel in a switch from autonomous driving level 3 to level 2. As described above, it may be possible to prompt to ensure the stability of travel.

Seventh Embodiment

A modification example of the autonomous driving control system 1 in the sixth embodiment will be described in a seventh embodiment.

In the autonomous driving control system 1 of the seventh embodiment, the processing executed by the state control unit 74*a*, the grip determination unit 74*b*, and the request output unit 74c of the sixth embodiment is mainly executed by the driving state control unit 120 of the HCU 100. The driving state control unit 120 executes the control switch and information presentation described in the driving change scenes 1 to 3 according to the reason for the switch from autonomous driving level 3 to level 2 (refer to FIG. 25). The seventh embodiment described above can also achieve the same effects as in the sixth embodiment.

Other Embodiments

The disclosure in the present specification is not limited to the exemplified embodiments. The disclosure includes exemplary embodiments and modifications by those skilled in the art based on the exemplary embodiments. For example, the disclosure is not limited to the component and/or element combinations described in the embodiments. The disclosure may be provided in various combinations. The disclosure may include additional portions that can be added to the embodiments. The disclosure includes those in which the components and/or elements of the embodiments are omitted. The disclosure includes the reallocation or combination of components and/or elements between one embodiment and another embodiment. The technical scope disclosed is not limited to the description of the embodiments. The several technical scopes disclosed are indicated by the description of the claims, and should be construed to include all modifications within the meaning and scope equivalent to the description of the claims.

The HCU 100 may be a dedicated computer that includes at least one of a digital circuit and an analog circuit as a processor. The digital circuit in particular is at least one of, for example, an application specific integrated circuit (ASIC), a field programmable gate array (FPGA), a system on a chip (SOC), a programmable gate array (PGA), and a complex programmable logic device (CPLD). Such a digital circuit may include a memory in which a program is stored.

The HCU 100 may be provided by a single computer or set of computer resources linked by a data communication device. For example, some of the functions provided by HCU 100 in the above-described embodiments may be realized by another ECU.

In the above-described embodiments, the HCU 100 requests the driver to execute hands-on when a switch from autonomous driving level 3 to autonomous driving level 2 at which hands-off is permitted is executed. Alternatively, or in addition to this, the HCU 100 may request the driver to execute hands-on when a switch from autonomous driving level 4 or higher to autonomous driving level 2 at which hands-off is permitted is executed.

What is claimed is:

1. A presentation control device that controls presentation of information to a driver of a vehicle capable of executing autonomous driving, the presentation control device comprising:

a determination unit that determines a switch between a monitoring unnecessary state and a monitoring necessary state, the monitoring unnecessary state being a state in which stoppage of periphery monitoring by the driver during execution of the autonomous driving being permitted, the monitoring necessary state being a state in which the stoppage of the periphery monitoring by the driver during execution of the autonomous driving being prohibited, the determination unit further determining whether stoppage of steering wheel grip by the driver is permittable in the monitoring necessary state; and a permit state control unit that, when the monitoring unnecessary state is switched to the monitoring necessary state in which the stoppage of steering wheel grip is permittable, permits the stoppage of steering wheel grip in the monitoring necessary state after executing a grip request, which requests the driver to grip the steering wheel, wherein, when the monitoring necessary state in which the stoppage of steering wheel grip is permittable has continued for a predetermined time or longer, the permit state control unit executes the grip request even when the monitoring necessary state in which the stoppage of steering wheel grip is permittable continues.

2. The presentation control device according to claim 1, wherein the permit state control unit stops the grip request when the monitoring necessary state in which the stoppage of steering wheel grip is permittable is switched to the monitoring unnecessary state.

3. The presentation control device according to claim 1, wherein the permit state control unit determines whether to execute the grip request based on a reason for the switch from the monitoring unnecessary state to the monitoring necessary state.

4. The presentation control device according to claim 3, wherein the reason for the switch includes at least one of elimination of traffic congestion or exit from a preset travel area in which stoppage of periphery monitoring is permitted, and the permit state control unit stops the grip request when the reason for the switch is the elimination of traffic congestion.

5. The presentation control device according to claim 3, wherein, when the reason for the switch is not elimination of traffic congestion and the traffic congestion continues, the permit state control unit executes the grip request after the monitoring unnecessary state is switched to the monitoring necessary state in which the stoppage of steering wheel grip is permittable.

6. The presentation control device according to claim 5, wherein, when the reason for the switch is disappearance of a rear vehicle traveling behind the vehicle, the permit state control unit executes the grip request after the monitoring unnecessary state is switched to the monitoring necessary state in which the stoppage of steering wheel grip is permittable.

7. The presentation control device according to claim 3, wherein the reason for the switch includes at least one of elimination of traffic congestion or exit from a preset travel area in which stoppage of periphery monitoring is permitted, and the permit state control unit stops the grip request when the reason for the switch is the exit from the preset travel area.

8. The presentation control device according to claim 1, wherein, when the monitoring unnecessary state is directly switched to the monitoring necessary state in which the stoppage of steering wheel grip is permittable, the permit state control unit executes a motion request for requesting the driver to change an arm position.

9. The presentation control device according to claim 1, wherein, when the monitoring unnecessary state is directly switched to the monitoring necessary state in which the stoppage of steering wheel grip is permittable, the permit state control unit executes a monitoring request for requesting the driver to execute the periphery monitoring and a posture request for requesting the driver to take a proper posture under a state of the stoppage of steering wheel grip.

10. The presentation control device according to claim 1, wherein, after the monitoring unnecessary state is switched to a manual driving state and then the autonomous driving becomes possible under the monitoring necessary state in which the stoppage of steering wheel grip is permittable, the permit state control unit omits a switch to the monitoring necessary state in which the stoppage of steering wheel grip is not permitted.

11. The presentation control device according to claim 1, wherein, even when the driver does not comply with the grip request, the permit state control unit permits the stoppage of steering wheel grip in the monitoring necessary state.

12. The presentation control device according to claim 1, further comprising a readiness determination unit that determines a level of readiness of the driver for the autonomous driving, wherein the determination unit is capable of changing a state of the autonomous driving, and before changing the state of the autonomous driving, the determination unit determines whether the changing of the state of the autonomous driving is permitted based on the level of readiness of the driver.

13. The presentation control device according to claim 12, wherein the determination unit continues the monitoring necessary state even when the level of the readiness decreases after the monitoring unnecessary state is switched to the monitoring necessary state.

14. The presentation control device according to claim 12, wherein, when a previous autonomous driving is switched to a manual driving and then switched to a current autonomous driving, the readiness determination unit determines whether data acquired in a previous readiness determination is usable for a current readiness determination, and in response to determining that the data acquired in the previous readiness determination is usable for the current readiness determination, the readiness determination unit uses the data acquired in the previous readiness determination for the current readiness determination.

15. The presentation control device according to claim 14, wherein, in response to determining that the data acquired in the previous readiness determination is not usable for the current readiness determination, the readiness determination unit acquires the data again and determines the readiness, and the permit state control unit notifies that the data is being acquired.

16. The presentation control device according to claim 12, wherein the determination unit determines whether a securing condition for securing that the driver has time to operate the steering wheel is established, and in a state where the securing condition is established, the determination unit sets a threshold for the level of the readiness at which changing of the state of the autonomous driving is permitted to be higher than a threshold for the level of the readiness in a state where the securing condition is not established.

17. The presentation control device according to claim 1, wherein, in a level decrease switch from a level 4 mode corresponding to autonomous driving level 4 under the monitoring unnecessary state to (i) a level 3 mode corresponding to autonomous driving level 3 under the monitoring unnecessary state, (ii) the monitoring necessary state in which the stoppage of steering wheel grip is permitted, or (iii) a manual driving state, the determination unit performs the level decrease switch via the monitoring necessary state in which the stoppage of steering wheel grip is prohibited immediately after the level 4 mode, and the permit state control unit executes the grip request in the monitoring necessary state, which is a via state in the level decrease switch.

18. The presentation control device according to claim 17, wherein, when the determination unit determines that a securing condition for securing that the driver has time to operate the steering wheel is not established, the determination unit outputs a switch stoppage determination to the monitoring necessary state in which the stoppage of steering wheel grip is prohibited as the via state immediately after the level 4 mode, and the permit state control unit stops execution of the grip request when the switch stoppage determination is output.

19. The presentation control device according to claim 18, wherein, even when the determination unit determines that the securing condition is not established, the determination unit performs the level decrease switch via the monitoring necessary state in which the stoppage of steering wheel grip is prohibited, and the level decrease switch is a switch to the monitoring necessary state in which at least one of steering, acceleration or deceleration of the vehicle is controlled by the autonomous driving or is a switch to the manual driving state.

20. The presentation control device according to claim 17, wherein the determination unit changes a state switch destination according to a reason for canceling the level 4 mode in the level decrease switch.

21. The presentation control device according to claim 1, wherein the determination unit changes a state switch destination according to a reason for canceling the monitoring unnecessary state in a switch from the monitoring unnecessary state to the monitoring necessary state or in a switch from the monitoring unnecessary state to a manual driving state.

22. A computer-readable non-transitory storage medium storing a presentation control program, the program controlling presentation of information to a driver of a vehicle capable of executing autonomous driving and comprising instructions be executed by a processor, the instructions comprising:

determining a switch between a monitoring unnecessary state and a monitoring necessary state, the monitoring unnecessary state being a state in which stoppage of periphery monitoring by the driver during execution of the autonomous driving being permitted, the monitoring necessary state being a state in which the stoppage of the periphery monitoring by the driver during execution of the autonomous driving being prohibited;

determining whether stoppage of steering wheel grip by the driver is permittable in the monitoring necessary state; and permitting, when the monitoring unnecessary state is switched to the monitoring necessary state in which the stoppage of steering wheel grip is permittable, the stoppage of steering wheel grip in the monitoring necessary state after executing a grip request, which requests the driver to grip the steering wheel, wherein, when the monitoring necessary state in which the stoppage of steering wheel grip is permittable has continued for a predetermined time or longer, the processor executes the grip request even when the monitoring necessary state in which the stoppage of steering wheel grip is permittable continues.

23. An autonomous driving control device capable of executing autonomous driving of a vehicle, the autonomous driving control device comprising:

a state control unit executing a switch between a monitoring unnecessary state and a monitoring necessary state, the monitoring unnecessary state being a state in which stoppage of periphery monitoring by a driver during execution of the autonomous driving being permitted, the monitoring necessary state being a state in which the stoppage of the periphery monitoring by the driver during execution of the autonomous driving being prohibited;

a grip determination unit determining whether stoppage of steering wheel grip by the driver is permittable in the monitoring necessary state; and a request output unit outputting a grip request to the driver to grip the steering wheel when a switch from the monitoring unnecessary state to the monitoring necessary state in which the stoppage of steering wheel grip is permittable is executed, wherein, when the switch from the monitoring unnecessary state to the monitoring necessary state is to be executed due to elimination of traffic congestion, the grip determination unit executes a temporary switch from the monitoring unnecessary state to the monitoring necessary state in which the stoppage of steering wheel grip is not permitted, and then switches to the monitoring necessary state in which the stoppage of steering wheel grip is permittable.

24. The autonomous driving control device according to claim 23, wherein the grip determination unit permits the stoppage of steering wheel grip in the monitoring necessary state after the grip request is output by the request output unit.

25. The autonomous driving control device according to claim 23, wherein, when the switch from the monitoring unnecessary state to the monitoring necessary state is to be executed for a reason other than elimination of traffic congestion, the grip determination unit switches from the monitoring unnecessary state to the monitoring necessary state in which the stoppage of steering wheel grip is permittable and then switches to the monitoring necessary state in which the stoppage of steering wheel grip is not permitted.

26. A computer-readable non-transitory storage medium storing an autonomous driving control program, the program executing an autonomous driving of a vehicle and comprising instructions to be executed by a processor, the instructions comprising:

executing a switch between a monitoring unnecessary state and a monitoring necessary state, the monitoring unnecessary state being a state in which stoppage of periphery monitoring by a driver during execution of the autonomous driving being permitted, the monitoring necessary state being a state in which the stoppage of the periphery monitoring by the driver during execution of the autonomous driving being prohibited;

determining whether stoppage of steering wheel grip by the driver is permittable in the monitoring necessary state; and outputting a grip request to the driver to grip the steering wheel when a switch from the monitoring unnecessary state to the monitoring necessary state in which the stoppage of steering wheel grip is permittable is executed, wherein, when the switch from the monitoring unnecessary state to the monitoring necessary state is to be executed due to elimination of traffic congestion, the processor executes a temporary switch from the monitoring unnecessary state to the monitoring necessary state in which the stoppage of steering wheel grip is not permitted, and then switches to the monitoring necessary state in which the stoppage of steering wheel grip is permittable.

27. A presentation control device that controls presentation of information to a driver of a vehicle capable of executing autonomous driving, the presentation control device comprising:

a determination unit that determines a switch between a monitoring unnecessary state and a monitoring necessary state, the monitoring unnecessary state being a state in which stoppage of periphery monitoring by the driver during execution of the autonomous driving being permitted, the monitoring necessary state being a state in which the stoppage of the periphery monitoring by the driver during execution of the autonomous driving being prohibited, the determination unit further determining whether stoppage of steering wheel grip by the driver is permittable in the monitoring necessary state; and a permit state control unit that, when the monitoring unnecessary state is switched to the monitoring necessary state in which the stoppage of steering wheel grip is permittable, permits the stoppage of steering wheel grip in the monitoring necessary state after executing a grip request, which requests the driver to grip the steering wheel, wherein, when the monitoring unnecessary state is directly switched to the monitoring necessary state in which the stoppage of steering wheel grip is permittable, the permit state control unit executes a motion request for requesting the driver to change an arm position.

28. A presentation control device that controls presentation of information to a driver of a vehicle capable of executing autonomous driving, the presentation control device comprising:

a determination unit that determines a switch between a monitoring unnecessary state and a monitoring necessary state, the monitoring unnecessary state being a state in which stoppage of periphery monitoring by the driver during execution of the autonomous driving being permitted, the monitoring necessary state being a state in which the stoppage of the periphery monitoring by the driver during execution of the autonomous driving being prohibited, the determination unit further determining whether stoppage of steering wheel grip by the driver is permittable in the monitoring necessary state; and a permit state control unit that, when the monitoring unnecessary state is switched to the monitoring necessary state in which the stoppage of steering wheel grip is permittable, permits the stoppage of steering wheel grip in the monitoring necessary state after executing a grip request, which requests the driver to grip the steering wheel, wherein, when the monitoring unnecessary state is directly switched to the monitoring necessary state in which the stoppage of steering wheel grip is permittable, the permit state control unit executes a monitoring request for requesting the driver to execute the periphery monitoring and a posture request for requesting the driver to take a proper posture under a state of the stoppage of steering wheel grip.

29. A presentation control device that controls presentation of information to a driver of a vehicle capable of executing autonomous driving, the presentation control device comprising:

a determination unit that determines a switch between a monitoring unnecessary state and a monitoring necessary state, the monitoring unnecessary state being a state in which stoppage of periphery monitoring by the driver during execution of the autonomous driving being permitted, the monitoring necessary state being a state in which the stoppage of the periphery monitoring by the driver during execution of the autonomous driving being prohibited, the determination unit further determining whether stoppage of steering wheel grip by the driver is permittable in the monitoring necessary state;

a permit state control unit that, when the monitoring unnecessary state is switched to the monitoring necessary state in which the stoppage of steering wheel grip is permittable, permits the stoppage of steering wheel grip in the monitoring necessary state after executing a grip request, which requests the driver to grip the steering wheel; and a readiness determination unit that determines a level of readiness of the driver for the autonomous driving, wherein the determination unit is capable of changing a state of the autonomous driving, and before changing the state of the autonomous driving, the determination unit determines whether the changing of the state of the autonomous driving is permitted based on the level of readiness of the driver.

30. A presentation control device that controls presentation of information to a driver of a vehicle capable of executing autonomous driving, the presentation control device comprising:

a determination unit that determines a switch between a monitoring unnecessary state and a monitoring necessary state, the monitoring unnecessary state being a state in which stoppage of periphery monitoring by the driver during execution of the autonomous driving being permitted, the monitoring necessary state being a state in which the stoppage of the periphery monitoring by the driver during execution of the autonomous driving being prohibited, the determination unit further determining whether stoppage of steering wheel grip by the driver is permittable in the monitoring necessary state; and a permit state control unit that, when the monitoring unnecessary state is switched to the monitoring necessary state in which the stoppage of steering wheel grip is permittable, permits the stoppage of steering wheel grip in the monitoring necessary state after executing a grip request, which requests the driver to grip the steering wheel, wherein, in a level decrease switch from a level 4 mode corresponding to autonomous driving level 4 under the monitoring unnecessary state to (i) a level 3 mode corresponding to autonomous driving level 3 under the monitoring unnecessary state, (ii) the monitoring necessary state in which the stoppage of steering wheel grip is permitted, or (iii) a manual driving state, the determination unit performs the level decrease switch via the monitoring necessary state in which the stoppage of steering wheel grip is prohibited immediately after the level 4 mode, and the permit state control unit executes the grip request in the monitoring necessary state, which is a via state in the level decrease switch.

31. A presentation control device that controls presentation of information to a driver of a vehicle capable of executing autonomous driving, the presentation control device comprising:

a determination unit that determines a switch between a monitoring unnecessary state and a monitoring necessary state, the monitoring unnecessary state being a state in which stoppage of periphery monitoring by the driver during execution of the autonomous driving being permitted, the monitoring necessary state being a state in which the stoppage of the periphery monitoring by the driver during execution of the autonomous driving being prohibited, the determination unit further determining whether stoppage of steering wheel grip by the driver is permittable in the monitoring necessary state; and a permit state control unit that, when the monitoring unnecessary state is switched to the monitoring necessary state in which the stoppage of steering wheel grip is permittable, permits the stoppage of steering wheel grip in the monitoring necessary state after executing a grip request, which requests the driver to grip the steering wheel, wherein, the determination unit changes a state switch destination according to a reason for canceling the monitoring unnecessary state in a switch from the monitoring unnecessary state to the monitoring necessary state or in a switch from the monitoring unnecessary state to a manual driving state.

32. An autonomous driving control device capable of executing autonomous driving of a vehicle, the autonomous driving control device comprising:

a state control unit executing a switch between a monitoring unnecessary state and a monitoring necessary state, the monitoring unnecessary state being a state in which stoppage of periphery monitoring by a driver during execution of the autonomous driving being permitted, the monitoring necessary state being a state in which the stoppage of the periphery monitoring by the driver during execution of the autonomous driving being prohibited;

a grip determination unit determining whether stoppage of steering wheel grip by the driver is permittable in the monitoring necessary state; and a request output unit outputting a grip request to the driver to grip the steering wheel when a switch from the monitoring unnecessary state to the monitoring necessary state in which the stoppage of steering wheel grip is permittable is executed, wherein, when the switch from the monitoring unnecessary state to the monitoring necessary state is to be executed for a reason other than elimination of traffic congestion, the grip determination unit switches from the monitoring unnecessary state to the monitoring necessary state in which the stoppage of steering wheel grip is permittable and then switches to the monitoring necessary state in which the stoppage of steering wheel grip is not permitted.

* * * * *